United States Patent
Shih et al.

(10) Patent No.: US 12,089,176 B2
(45) Date of Patent: Sep. 10, 2024

(54) USER EQUIPMENT AND METHOD FOR HANDLING USER EQUIPMENT ONBOARDING

(71) Applicant: FG Innovation Company Limited, Tuen Mun (HK)

(72) Inventors: Mei-Ju Shih, Taipei (TW); Yung-Lan Tseng, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 358 days.

(21) Appl. No.: 17/700,866

(22) Filed: Mar. 22, 2022

(65) Prior Publication Data

US 2022/0312359 A1    Sep. 29, 2022

Related U.S. Application Data

(60) Provisional application No. 63/166,148, filed on Mar. 25, 2021.

(51) Int. Cl.
*H04W 60/00* (2009.01)
*H04W 8/18* (2009.01)
(Continued)

(52) U.S. Cl.
CPC .............. *H04W 60/00* (2013.01); *H04W 8/18* (2013.01); *H04W 48/16* (2013.01); *H04W 88/02* (2013.01)

(58) Field of Classification Search
CPC ....... H04W 60/00; H04W 8/18; H04W 48/16; H04W 88/02
See application file for complete search history.

(56) References Cited

U.S. PATENT DOCUMENTS 11,622,272 B2 *   4/2023   Zisimopoulos ......... H04W 8/18
                                              370/329
2020/0396792 A1   12/2020   Tiwari et al.
(Continued)

FOREIGN PATENT DOCUMENTS

| CN | 111757557 A | 10/2020 |
|---|---|---|
| CN | 112399507 A | 2/2021 |
| WO | 2021028614 A1 | 2/2021 |

OTHER PUBLICATIONS

China Telecom:"Enhancement of Private Network support for NG-RAN", 3GPP Draft; RP-210776, 3GPP, vol. TSG RAN, No. Electronic Meeting; Mar. 16, 2021-Mar. 26, 2021, Mar. 24, 2021, XP051990780, para. [2.2.1].

(Continued)

*Primary Examiner* — Wayne H Cai
(74) *Attorney, Agent, or Firm* — ScienBiziP, P.C.

(57) ABSTRACT

A UE and a method for handling UE onboarding are provided. The method includes receiving a first indication, a second indication, and a third indication from a cell via a SIB1, the cell operated by one or more SNPNs; reporting, by an AS layer of the UE, the first indication, the second indication, and the third indication to a NAS layer of the UE; receiving, by the AS layer of the UE, an indication for UE onboarding from the NAS layer of the UE; and transmitting a first RRC message to the cell, the first RRC message including an onboarding request associated with the indication for UE onboarding.

20 Claims, 6 Drawing Sheets

(51) Int. Cl.
*H04W 48/16* (2009.01)
*H04W 88/02* (2009.01)

(56) References Cited

U.S. PATENT DOCUMENTS

2021/0058784 A1   2/2021   Kedalagudde et al.
2022/0240210 A1*  7/2022   Lai ..................... H04W 60/00

OTHER PUBLICATIONS

Huawei et al:"Discussion on RAN2 impact of supporting SNPN with credentials owned by a separated entity", 3GPP Draft; R2-2101001, 3GPP, vol. RAN WG2, No. Online; Jan. 25, 2021-Feb. 2, 2021, Jan. 15, 2021, XP051974043, para. [02.2]-[02.4].

"3rd Generation Partnership Project; Technical Specification Group Services and System Aspects; Study on enhanced support of non-public networks (Release 17)", 3GPP Standard; Technical Report; 3GPP TR 23.700-07, 3GPP, vol. SA WG2, No. V2.0.0, Mar. 15, 2021, pp. 1-248, XP052000005, para. [6.27.3.2.1], figures 6.27.3.2.1-1.

3GPP TS 38.331, "3rd Generation Partnership Project; Technical Specification Group Radio Access Network; NR; Radio Resource Control (RRC) protocol specification (Release 16)", V16.3.1 (Jan. 2021).

3GPP TS 38.304, "3rd Generation Partnership Project; Technical Specification Group Radio Access Network; NR; User Equipment (UE) procedures in Idle mode and RRC Inactive state (Release 16)", V16.3.0 (Dec. 2020).

Status Report to TSG, RP-210361, 3GPP TSG RAN Meeting #91-e, Electronic Meeting, Mar. 16-26, 2021 (Mar. 14, 2021), Section 2.2.

CATT, "Consideration on SNPN with Subscription or Credentials by a Separate Entity", R2-2100277, 3GPP TSG-RAN WG2 Meeting #113-e, Electronic, Jan. 25-Feb. 5, 2021(Jan. 15, 2021).

Ericsson, "SNPN and Service Provider (SP) separation", R2-2100490, 3GPP TSG-RAN WG2 #113e, Electronic meeting, Jan. 25-Feb. 5, 2021(Jan. 15, 2021).

ZTE Corporation, Sanechips, "Consideration on the Separate Entity Supporting", R2-2100431, 3GPP TSG-RAN WG2 Meeting #113-e, Online, Jan. 25-Feb. 5, 2021(Jan. 15, 2021).

Qualcomm Incorporated, "Access to SNPN with credentials from a different entity", R2-2100441, 3GPP TSG-RAN WG2 Meeting #113-e, Electronic, Jan. 25-Feb. 5, 2021(Jan. 15, 2021).

Vivo, "Support SNPN with subscription or credentials by a separate entity", R2-2100838, 3GPP TSG-RAN WG2 Meeting #113 electronic, E-Meeting, Jan. 25-Feb 5, 2021(Jan. 15, 2021).

CMCC, "Support SNPN along with credentials owned by an entity separate from the SNPN", R2-2101717, 3GPP TSG-RAN WG2 Meeting #113 electronic, Online, Jan. 25-Feb. 5, 2021(Jan. 15, 2021).

Nokia, "Summary of [AT113-e][031][eNPN] SNPN with subscription or credentials by a separate entity", R2-2102362, 3GPP TSG-RAN WG2 Meeting #113 Electronic, Jan. 25-Feb. 5, 2021(Feb. 3, 2021).

* cited by examiner

USER EQUIPMENT AND METHOD FOR HANDLING USER EQUIPMENT ONBOARDING

CROSS-REFERENCE TO RELATED APPLICATION(S)

The present disclosure claims the benefit of and priority to U.S. Provisional Patent Application Ser. No. 63/166,148, filed on Mar. 25, 2021, entitled "METHOD AND APPARATUS FOR UE ONBOARDING IN NON-PUBLIC NETWORK," the content of which is hereby incorporated fully by reference herein into the present disclosure for all purposes.

FIELD

The present disclosure is related to wireless communication, and more specifically, to a user equipment (UE) and a method for handling UE onboarding in the next-generation wireless communication network.

BACKGROUND

With the tremendous growth in the number of connected devices and the rapid increase in user/network traffic volume, various efforts have been made to improve different aspects of wireless communication for the next-generation wireless communication system, such as 5G NR, by improving data rate, latency, reliability, and mobility.

The 5G NR system is designed to provide flexibility and configurability for optimizing the network services and types and accommodating various use cases such as eMBB, mMTC, and URLLC.

However, as the demand for radio access continues to increase, there is a need for further improvements in wireless communication for the next-generation wireless communication system.

SUMMARY

The present disclosure is related to a method for handling UE onboarding performed by a UE.

According to a first aspect of the present disclosure, a method for handling UE onboarding performed by a UE is provided. The method includes receiving a first indication, a second indication, and a third indication from a cell via a SIB1, the cell operated by one or more SNPNs; reporting, by an AS layer of the UE, the first indication, the second indication, and the third indication to a NAS layer of the UE; receiving, by the AS layer of the UE, an indication for UE onboarding from the NAS layer of the UE; and transmitting a first RRC message to the cell, the first RRC message including an onboarding request associated with the indication for UE onboarding, wherein the first indication indicates whether each particular SNPN of the one or more SNPNs operating the cell supports access using credentials provided by a separate entity that does not operate the cell; the second indication indicates whether each particular SNPN of the one or more SNPNs operating the cell allows registrations from UEs that are not explicitly configured to select the particular SNPN; and the third indication indicates whether each particular SNPN of the one or more SNPNs operating the cell supports the UE onboarding.

According to an implementation of the first aspect, the method further includes receiving one or more group IDs from the cell via a SIB different from the SIB1, wherein each of the one or more group IDs is associated with at least one of the one or more SNPNs operating the cell.

According to an implementation of the first aspect, each of the first indication, the second indication, and the third indication for an SNPN of the one or more SNPNs operating the cell is in an ENUMERATED {true} format.

According to an implementation of the first aspect, the method further includes performing an SNPN selection procedure based on the first indication, the second indication, and the third indication.

According to an implementation of the first aspect, the indication for UE onboarding is received after the SNPN selection procedure is completed.

According to an implementation of the first aspect, the method further includes transmitting a second RRC message to a CN via the cell, the second RRC message including first information about UE credentials and second information about a UE onboarding indication, wherein the first information and the second information are from the NAS layer of the UE; and the first information and the second information enable the CN to determine whether the UE is allowed to perform a registration procedure for onboarding.

According to an implementation of the first aspect, the method further includes receiving a first NAS message from the CN via the cell, the first NAS message indicating that the UE is allowed to perform the registration procedure for onboarding; and transmitting a second NAS message to the CN via the cell in response to receiving the first NAS message.

According to an implementation of the first aspect, the method further includes receiving a first NAS message from the CN via the cell, the first NAS message indicating that the UE is rejected to perform the registration procedure for onboarding.

According to an implementation of the first aspect, the second information enables an AMF and an SMF in the CN to determine whether the UE is allowed to perform a UE onboarding procedure.

According to an implementation of the first aspect, the second information enables the cell to select an AMF in the CN.

According to a second aspect of the present disclosure, a UE for handling UE onboarding is provided. The UE includes one or more non-transitory computer-readable media having computer-executable instructions embodied therein; and at least one processor coupled to the one or more non-transitory computer-readable media, the at least one processor configured to execute the computer-executable instructions to cause the UE to receive a first indication, a second indication, and a third indication from a cell via a SIB1, the cell operated by one or more SNPNs; report, by an AS layer of the UE, the first indication, the second indication, and the third indication to a NAS layer of the UE; receive, by the AS layer of the UE, an indication for UE onboarding from the NAS layer of the UE; and transmit a first RRC message to the cell, the first RRC message including an onboarding request associated with the indication for UE onboarding, wherein the first indication indicates whether each particular SNPN of the one or more SNPNs operating the cell supports access using credentials provided by a separate entity that does not operate the cell; the second indication indicates whether each particular SNPN of the one or more SNPNs operating the cell allows registrations from UEs that are not explicitly configured to select the particular SNPN; and the third indication indicates whether each particular SNPN of the one or more SNPNs operating the cell supports UE onboarding.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

DESCRIPTION

Figure 1:
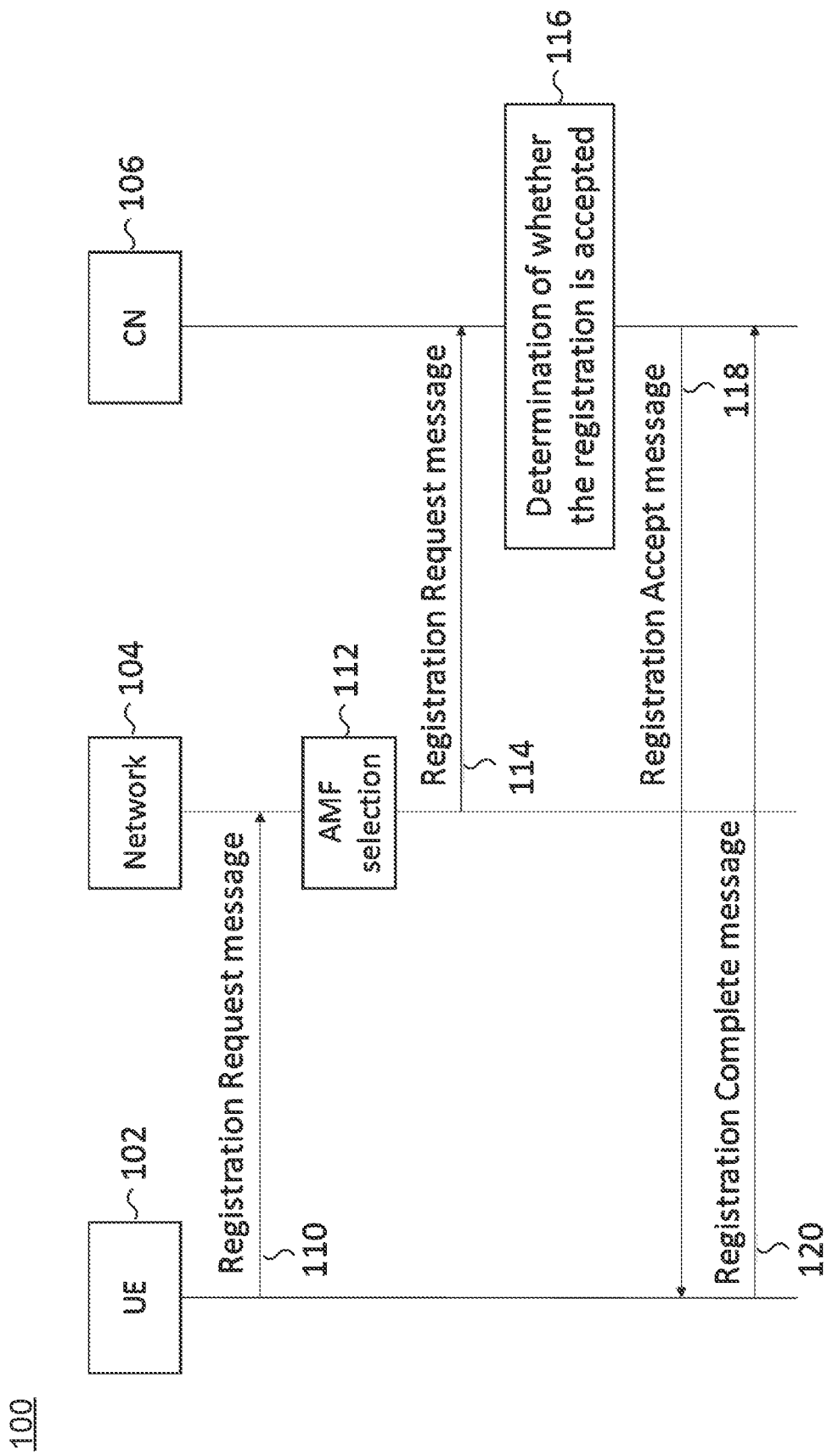
FIG. 1 is a signaling flow diagram illustrating a registration procedure between a UE, a network, and a CN according to an example implementation of the present disclosure.

The acronyms in the present disclosure are defined as follows and unless otherwise specified, the acronyms have the following meanings:

| Abbreviation | Full name |
| --- | --- |
| 3GPP | 3$^{rd}$ Generation Partnership Project |
| 5G | 5$^{th}$ Generation |
| 5GC | 5G Core |
| AMF | Access and Mobility Function |
| AS | Access Stratum |
| BS | Base Station |
| BSC | Base Station Controller |
| CA | Carrier Aggregation |
| CCCH | Common Control Channel |
| CN | Core Network |
| CP | Cyclic Prefix |
| DC | Dual Connectivity |
| DCCH | Dedicated Control Channel |
| DCS | Default Credential Server |
| DL | Downlink |
| E-UTRA(N) | Evolved Universal Terrestrial Radio Access (Network) |
| eMBB | enhanced Mobile Broadband |
| eNB | evolved Node B |
| EN-DC | E-UTRA NR Dual Connectivity |
| EPC | Evolved Packet Core |
| gNB | Next-Generation Node B |
| GSM | Global System for Mobile communications |
| HRNN | Human Readable Network Name |
| ID | Identifier/Identity |
| IE | Information Element |
| LDPC | Low-Density Parity-Check |
| LTE | Long Term Evolution |
| LTE-A | LTE-Advanced |
| MAC | Medium Access Control |
| MCG | Master Cell Group |
| MeNB | Master eNB |
| mMTC | massive Machine-Type Communication |
| MN | Master Node |
| MR-DC | Multi-RAT Dual Connectivity |
| NAS | Non-Access Stratum |
| NB | Node B |
| ng-eNB | next-generation eNB |
| NGC | Next-Generation Core |
| NPN | Non-Public Network |
| NR | New Radio |
| ON-SNPN | Onboarding SNPN |
| OFDM | Orthogonal Frequency-Division Multiplexing |
| ON | Onboarding Network |
| PCell | Primary Cell |
| PDCP | Packet Data Convergence Protocol |
| PDU | Protocol Data Unit |
| PHY | Physical |
| PLMN | Public Land Mobile Network |
| ProSe | Proximity Service |
| PS | Provisioning Server |
| PSCell | Primary Secondary Cell/Primary SCG Cell |
| RAN | Radio Access Network |
| RAT | Radio Access Technology |
| RNC | Radio Network Controller |
| RRC | Radio Resource Control |
| SCell | Secondary Cell |
| SCG | Secondaty Cell Group |
| SgNB | Secondary gNB |
| SI | System Information |
| SIB | System Information Block |
| SIB1 | System Information Block Type 1 |
| SL | SideLink |
| SMF | Session Management Function |
| SN | Secondary Node |
| SNPN | Stand-Alone Non-Public Network |
| SO | Subscription Owner |
| SOHO | Small Office Home Office |
| SpCell | Special Cell |
| SRB0 | Signaling Radio Bearer 0 |
| SRB1 | Signaling Radio Bearer 1 |
| TS | Technical Specification |
| UE | User Equipment |
| UL | Uplink |
| UMTS | Universal Mobile Telecommunications System |
| UPF | User Plane Function |
| URLLC | Ultra-Reliable Low-Latency Communication |
| UTRAN | Universal Terrestrial Radio Access Network |
| V2X | Vehicle-to-Everything |

The following contains specific information related to example implementations of the present disclosure. The drawings and their accompanying detailed description are merely directed to example implementations. However, the present disclosure is not limited to these example implementations. Other variations and implementations of the present disclosure will be obvious to those skilled in the art.

Unless noted otherwise, like or corresponding elements among the drawings may be indicated by like or corresponding reference designators. Moreover, the drawings and illustrations in the present disclosure are generally not to scale, and are not intended to correspond to actual relative dimensions.

For the purpose of consistency and ease of understanding, like features may be identified (although, in some examples, not illustrated) by the same reference designators in the drawings. However, the features in different implementations may differ in other respects and shall not be narrowly confined to the implementations illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

The terms "if", "in a case that", "when", "after", "upon", and "once" may be used interchangeably.

For the purposes of explanation and non-limitation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Application-Specific integrated Circuitry (ASIC), programmable logic arrays, and/or using one or more Digital Signal Processors (DSPs). Although some of the disclosed implementations are oriented to software installed and executing on computer hardware, alternative example implementations implemented as firmware or as hardware or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as an LTE system, an LTE-A system, an LTE-Advanced Pro system, or a 5G NR RAN may typically include at least one BS, at least one UE, and one or more optional network elements that provide connection within a network. The UE may communicate with the network such as a CN, an EPC network, an E-UTRAN, an NGC, a 5GC, or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least an RAT such as Worldwide Interoperability for Microwave Access (WiMAX), Global System for Mobile communications (GSM that is often referred to as 2G), GSM Enhanced Data rates for GSM Evolution (EDGE) RAN (GERAN), General Packet Radio Service (GPRS), Universal Mobile Telecommunication System (UMTS that is often referred to as 3G) based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LIE-A Pro. However, the scope of the present disclosure is not limited to these protocols.

The BS may include, but is not limited to, an NB in the UMTS, an eNB in LTE or LTE-A, an RNC in UMTS, a BSC in the GSM/GERAN, an ng-eNB in an E-UTRA BS in connection with 5GC, a gNB in the 5G-RAN (or in the 5G Access Network (5G-AN)), or any other apparatus capable of controlling radio communication and managing radio resources within a cell. The BS may serve one or more UEs via a radio interface.

The BS may be operable to provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate SL resources for supporting ProSe, LTE SL services, and/or LTE/NR V2X services. Each cell may have overlapped coverage areas with other cells.

In MR-DC cases, the primary cell of an MCG or an SCG may be called an SpCell. A PCell may refer to the SpCell of an MCG. A PSCell may refer to the SpCell of an SCG. An MCG may refer to a group of serving cells associated with the MN, comprising the SpCell and optionally one or more SCells. An SCG may refer to a group of serving cells associated with the SN, comprising the SpCell and optionally one or more SCells.

As disclosed above, the frame structure for NR supports flexible configurations for accommodating various next-generation (e.g., 5G) communication requirements such as eMBB, mMTC, and URLLC, while fulfilling high reliability, high data rate and low latency requirements. The OFDM technology in the 3GPP may serve as a baseline for an NR waveform. The scalable OFDM numerology such as adaptive sub-carrier spacing, channel bandwidth, and CP may also be used.

Two coding schemes are considered for NR, specifically LDPC code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable (e.g., based on the network dynamics of NR). SL resources may also be provided in an NR frame to support ProSe services, V2X services (e.g., E-UTRA V2X SL communication services) or SL services (e.g., NR SL communication services). In contrast, SL resources may also be provided in an E-UTRA frame to support ProSe services, V2X services (e.g., E-UTRA V2X SL communication services) or SL services (e.g., NR SL communication services).

Multiple PLMNs may operate on an unlicensed spectrum. Multiple PLMNs may share the same unlicensed carrier. The PLMNs may be public or private. Public PLMNs may be (but not limited to) operators or virtual operators, which provide radio services to public subscribers. Public PLMNs may own a licensed spectrum and support an RAT on the licensed spectrum as well. Private PLMNs may be (but not limited to) micro-operators, factories, or enterprises, which provide radio services to its private users (e.g., employees or machines). Public PLMNs may support more deployment scenarios (e.g., CA between licensed band NR (PCell) and NR-Unlicensed (NR-U) (SCell), DC between licensed band LTE (PCell) and NR-U (PSCell), stand-alone NR-U, an NR cell with DL in an unlicensed band and UL in a licensed band, DC between licensed band NR (PCell) and NR-U (PSCell)). Private PLMNs may support (but not limited to) stand-alone unlicensed RAT (e.g., stand-alone NR-U).

Any two or more than two of the following sentences, paragraphs, (sub)-bullets, points, actions, behaviors, terms, alternatives, aspects, examples, or claims described in the following disclosure may be combined logically, reasonably, and properly to form a specific method.

Any sentence, paragraph, (sub)-bullet, point, action, behaviors, terms, alternatives, aspects, examples, or claims described in the following disclosure may be implemented independently and separately to form a specific method.

Dependency (e.g., "based on", "more specifically", "preferably", "In one embodiment", "In some implementations", "In one alternative", "In one example", "In one aspect", or etc.) in the following disclosure is just one possible example which would not restrict the specific method.

Example description of some selected terms, examples, embodiments, implementations, actions, and/or behaviors used in the present disclosure are given as follows.

The terms "network", "RAN", "cell", "camped cell", "serving cell", "BS", "gNB", "eNB" and "ng-eNB" may be used interchangeably. In some implementations, some of these items may refer to the same network entity.

Cell: A cell may be a radio network object that can be uniquely identified by a UE from a (cell) identification that is broadcast over a geographical area from one UTRAN Access Point. The Cell may be either FDD or TDD mode.

Serving cell: For a UE in RRC_CONNECTED state not configured with CA or DC, there may be only one serving cell, which may be referred to as a PCell. For a UE in RRC_CONNECTED state configured with CA or DC, the term "serving cells" may be used to denote a set of cells comprising SpCell(s) and all SCells. For example, the serving cell may be a PCell, a PSCell, or an SCell described in the 3GPP TS 38.331.

A UE (operating) in RRC_CONNECTED state may refer to an RRC_CONNECTED UE. A UE (operating) in RRC_IDLE state may refer to an RRC_IDLE UE. A UE (operating) in RRC_INACTIVE state may refer to an RRC_INACTIVE UE.

SpCell: For DC operation, the term SpCell may refer to a PCell of an MCG or a PSCell of an SCG. Otherwise, the term SpCell may refer to the PCell.

The disclosed mechanism may be applied to any RAT. The RAT may be (but not limited to) NR, NR-U, LTE, E-UTRA connected to 5GC, LTE connected to 5GC, E-UTRA connected to EPC, and LTE connected to EPC. The disclosed mechanism may be applied for UEs in public networks, or in private networks (e.g., NPN, SNPN, and PNI-NPN).

The disclosed mechanism may be used for licensed frequency and/or unlicensed frequency.

SI may refer to MIB, SIB1, and other SI. Minimum SI may include MIB and SIB1. Other SI may refer to SIB3, SIB4, SIB5, and other SIB(s) (e.g., SNPN-specific SIB PNI-NPN-specific SIB).

Dedicated signaling may refer to (but not limited to) RRC message(s). For example, the RRC message(s) may include an RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. RRC message may be one kind of dedicated signaling. The UE may receive the RRC message from the network via unicast/broadcast/groupcast.

The RRC_CONNECTED UE, RRC_INACTIVE UE, and RRC_IDLE UE may apply the UE behaviors described in the present disclosure.

Generally, the disclosed mechanisms may be (but not limited to) applied for the PCell and the UE. In addition, the mechanisms described in the present disclosure may be applied for the PSCell and the UE.

Allowed CAG list: An allowed CAG list may be a per-PLMN list of CAG IDs the UE is allowed to access.

CAG cell: A CAG cell may be a cell broadcasting at least one CAG ID.

Non-CAG cell: A non-CAG cell may be a cell not broadcasting any CAG IDs.

GAG Member Cell: A CAG member cell may be, for a UE, a cell broadcasting an ID of the selected PLMN, registered PLMN or equivalent PLMN, and for that PLMN, a CAG ID belonging to the allowed CAG list of the UE for that PLMN.

CAG ID: A CAG ID may identify a CAG within a PLMN.

NID: An NID may identify an SNPN in combination with a PLMN ID.

NPN: An NPN may be a network deployed for non-public use.

NPN-only Cell: An NPN-only cell may be a cell that is only available for normal services for subscribers of NPNs. An NPN-capable UE may determine that a cell is the NPN-only cell by detecting that a cellReservedForOtherUse IE is set to true while an npn-IdentityInfoList IE is present in a CellAccessRelatedInfo IE.

PNI-NPN ID: A PNI-NPN ID may be an ID of a PNI-NPN including a PLMN ID and a CAG ID combination.

Registered SNPN: A registered SNPN may be an SNPN on which certain Location Registration outcomes have occurred.

Selected SNPN: A selected SNPN may be a SNPN that has been selected by a NAS layer (e.g., a NAS layer of a UE, a NAS layer of a CN), either manually or automatically.

SNPN Access Mode: An SNPN access mode may be a mode of operation wherein a UE only selects SNPNs. A UE not (operating) in the SNPN access mode may be equivalent to a UE in a non-SNPN access mode. A UE in an SNPN access may be equivalent to a UE operating in SNPN access mode.

SNPN ID: An SNPN ID may be an ID of an SNPN including a PLMN ID and an NID combination.

SNPN-only cell: An SNPN-only cell may be a cell that is only available for normal services for SNPN subscribers.

An NPN-capable UE may correspond to a UE supporting CAG (or NPN).

MR-DC: An MR-DC may be DC between E-UTRA and NR nodes, or between two NR nodes. The MR-DC may include EN-DC, NR-E-UTRA Dual Connectivity (NE-DC), NG-RAN E-UTRA-NR Dual Connectivity (NGEN-DC), and NR-NR Dual Connectivity (NR-DC) (mode).

MCG: An MCG may be, in MR-DC, a group of serving cells associated with an MN comprising an SpCell (e.g., PCell) and optionally one or more SCells.

MN: An MN may be, in MR-DC, a radio access node that provides a control plane connection to a CN. The MN may be a Master eNB (in EN-DC), a Master ng-eNB (in NGEN-DC), or a Master gNB (in NR-DC and NE-DC).

SCG: An SCG may be, in MR-DC, a group of serving cells associated with an SN comprising an SpCell (e.g., PSCell) and optionally one or more SCells.

SN: An SN may be, in MR-DC, a radio access node, with no control plane connection to a CN, providing additional resources to a UE. The SN may be an en-gNB (in EN-DC), a Secondary ng-eNB (in NE-DC), or a Secondary gNB (in NR-DC and NGEN-DC).

MeNB: An MeNB may be an eNB as a master node associated with an MCG in MR-DC (scenarios).

SgNB: An SgNB may be a gNB as a secondary node associated with an SCG in MR-DC (scenarios).

In the presented disclosure, if a UE changes from an SNPN access mode to a PLMN access mode, the UE (e.g., a NAS entity of the UE) may release (or delete or discard) a (stored or maintained) list of SNPN ID(s). It should be noted that the UE may be in either the SNPN access mode or not in the SNPN access mode. The UE not in the SNPN access mode may be in a PLMN access mode. The UE not in the SNPN access mode may perform a PLMN selection (procedure) to select a PLMN. After the PLMN selection, the UE not in the SNPN access mode may perform cell (re)selection to camp on a cell that belongs to the selected PLMN. The UE may register with a network operated/owned by the selected PLMN, via the cell. After the registration, the selected PLMN may become the UE's registered PLMN. The UE in the SNPN access mode may perform an SNPN selection (procedure) to select an SNPN. After the SNPN selection, the UE in the SNPN access mode may perform cell (re)selection to camp on a cell that belongs to the selected SNPN. The UE may register with a network operated/owned by the selected SNPN, via the cell. After the registration, the selected SNPN may become the UE's registered SNPN.

In the presented disclosure, if a UE changes from a PLMN access mode to an SNPN access mode, the UE (e.g., a NAS entity of the UE) may release (or delete or discard) a (stored or maintained) list of PLMN ID(s).

An upper layer of a UE may refer (but is not limited to) to a NAS layer, RRC layer, PDCP layer, RLC layer, or a MAC layer.

A lower layer of a UE may refer (but is not limited to) to an RRC layer, PDCP layer, RLC layer, MAC layer, or PHY layer.

An AS layer of a UE may refer (but is not limited to) to an RRC layer, PDCP layer, RLC layer, MAC layer, and PHY layer.

A CN may include (but is not limited to) at least one of an AMF, a UPF, and an SMF.

ON-SNPN (or O-SNPN): An ON-SNPN may be an ON (e.g., SNPN network, PLMN network, PNI-NPN network) that provides an initial registration and/or access to a UE for UE onboarding.

Group ID (or ON Group ID): A group ID may be an ID that identifies a group of ONs. For example, the group ID may designate a group of SNPN operators that are all interconnected with each other.

One SNPN may take the role of both an ON and an SO. Alternatively, an ON and an SO may be different SNPNs (e.g., ON-SNPN and SO-SNPN).

A UE onboarding procedure in the present disclosure may be carried out by a registration procedure between a UE and a CN via a serving cell.

Network IDs (e.g., SNPN IDs) broadcast in a SIB1 may be associated with (but not limited to) at least one of an indication indicating a UE whether a cell (or SNPN(s) operating the cell) supports access using credentials from a separate entity that does not operate the cell, an indication that indicates to the UE whether a network (e.g., an SNPN) allows registration attempts from UEs that are not explicitly configured to select the network (e.g., the SNPN), and an indication that indicates to the UE whether a network (e.g., an SNPN) supports onboarding (e.g., support for UE onboarding indication). The terms "indication that indicates to the UE whether a network supports onboarding" and "support for UE onboarding indication" may be used interchangeably. The network IDs may also be associated with an HRNN in SIB10.

When an AS layer of the UE reports the one or more indications to a NAS layer of the UE, the AS layer of the UE may also report the associated HRNNs (e.g., if received by the UE) to the NAS layer of the UE.

When an AS layer of the UE reports determination results based on the one or more indications to a NAS layer of the UE, the AS layer of the UE may also report the associated HRNNs (e.g., if received by the UE) to the NAS layer of the UE.

Generally, a UE onboarding procedure in the present disclosure may be (but not limited to) applied for a UE onboarding procedure with the default UE credentials. In addition, the UE onboarding procedure in the present disclosure may be applied for a UE onboarding procedure without the (default) UE credentials and/or a UE onboarding procedure with NPN credentials (e.g., UE NPN credentials). A UE may be (pre)configured with the default UE credentials. A UE may be configured with the NPN credentials and/or PLMN credentials by the network. In some implementations, if (or once) the UE receives the NPN credentials and/or the PLMN credentials, the UE may discard the default UE credentials, and the UE may apply the received NPN credentials and/or the PLMN credentials. In some other implementations, if (or once) the UE receives the NPN credentials and/or the PLMN credentials, the UE may not discard the default UE credentials, and the UE may apply the received NPN credentials and/or the PLMN credentials.

In order to fulfill low latency and high reliability requirements for a vertical industry and to support 5G LAN-type service, a dedicated wireless network (e.g., a private network) may be included in the next-generation wireless network.

The private network (e.g., an NPN) may support vertical and LAN services. The private network may be classified into an SNPN and/or a PNI-NPN. Operators may focus on the PNI-NPN solutions applicable for a much wider range of use cases, such as SOHO and residential, private network coverage deployments, and so on.

The 5G system may be enhanced to support the NPN. Two network IDs are introduced for NPN:NID and CAG ID. A 5G RAN may also implement the NPN by enhancing features, such as NPN identification, discovery, selection/reselection, access control, and mobility restrictions. 5GS functionalities may be continuously enhanced to enable more efficient support for NPNs and to simplify the 5G system for NPNs.

In the next-generation wireless network (e.g., a 5G NR network), enhancements to support new features, such as supporting an SNPN along with credentials or subscriptions owned by an entity (e.g., a credential holder) separate from the SNPN, and supporting UE onboarding and remote provisioning may be considered. A RAN (e.g., especially in the SNPN or a PNI-NPN) may be enhanced to support the new features.

In the present disclosure, the disclosed mechanism may be for the UE to support the above-mentioned features. The disclosed mechanism may involve an interaction between a cell (e.g., an SNPN cell) and the UE, and/or a cross-layer interaction in the UE (e.g., between a NAS layer of the UE and an AS layer (e.g., an RRC layer) of the UE). The disclosed mechanism may include a cell (re)selection procedure, an RRC procedure, and a NAS procedure.

In the present disclosure, the terms "UE onboarding, procedure" and "UE onboarding" may be used interchangeably. The terms "UE credential(s)" and "UE's credential(s)" may be used interchangeably.

In some implementations, before an (actual) UE onboarding procedure, a UE may have information (e.g., default UE credentials) so that the UE is uniquely identifiable and verifiably secure. The UE may be authenticated by a DCS with the default UE credentials. The DCS may provide means to another entity to authenticate the UE.

In some implementations, the UE onboarding procedure may enable 3GPP connectivity for the UE to realize remote provisioning. The remote provisioning may include provisioning of information to the UE (and within a network) which is required for the UE to get authorized access and connectivity to an NPN. Before the remote provisioning, the UE may not get the authorized access and the connectivity to the NPN.

In some implementations, after the (actual) UE onboarding procedure, an SO (e.g., an entity) may store and provide subscription data and optionally other configuration information via a PS to the UE. The PS may be a server that provides (or provisions) the authenticated/authorized UE with the subscription data and the optionally other configuration information.

In some implementations, for UE onboarding (e.g., especially with the default UE credentials) and (remote) provisioning via an onboarding network (e.g., an SNPN network), the disclosed mechanism (e.g., including a cell (re)selection procedure, an RRC procedure, and a NAS procedure) may enable the UE to perform UE onboarding, acquire the UE credentials (e.g., NPN credentials), and/or get authentication and/or authorization from the network.

In some implementations, to meet a diverse variety of network deployment scenarios, a unified UE onboarding procedure may be desired. The disclosed mechanism for at least a UE onboarding procedure may be applied to a diverse variety of network deployment scenarios. From the network's perspective, the network deployment scenarios may include (but is not limited to) the following scenarios:

Existence of only SNPN network(s) (e.g., in an area).

Coexistence of SNPN network(s), PNI-NPN network(s), and PLMN network(s) (e.g., in an area).

Coexistence of SNPN network(s) and PNI-NPN network(s) (in an area).

Coexistence of SNPN network(s) and PLAIN network(s) (e.g., in an area).

The area (e.g., in the present disclosure) may be a tracking area (TA) of a UE, a RAN notification area of the UE, a geographical area (e.g., in a factory, in a space), or a coverage area in which the UE may receive a radio signal. The UE may be (pre)configured with the TA and/or the RAN notification area by a serving cell of the UE or by a (core) network via the serving cell of the UE. For example, the UE may be configured with the TA through a NAS message transmitted by the (core) network via the serving cell to the UE (e.g., especially when the UE is in an RRC_IDLE state). The UE may be configured with the RAN notification area through an RRC message (e.g., an RRC Release message with suspend configuration) by the serving cell (e.g., especially when the UE is in an RRC_INACTIVE state).

In some implementations, all the (deployed) SNPN network(s) (e.g., in the area) may be the UE's registered or selected SNPN(s) (e.g., cells of these SNPN network(s) broadcast the same PLMN ID and NID, which match the UE's registered or selected SNPN ID including a PLMN ID and an NID).

In some other implementations, all the (deployed) SNPN network(s) (e.g., in the area) may not be the UE's registered or selected. SNPN(s) (e.g., cells of these SNPN network(s) broadcast the same PLMN ID and NID or different PLMN ID(s) and/or NID(s) which cannot match the UE's registered or selected SNPN ID including a PLMN ID and an NID).

In some other implementations, some of the (deployed) SNPN network(s) may be the UE's registered or selected SNPN(s) (e.g., cells of these SNPN network(s) broadcast the same PLMN ID and NID, which match the UE's registered or selected SNPN ID including a PLMN ID and an NID), while some of the (deployed) SNPN network(s) may not be the UE's registered or selected SNPN(s) (e.g., cells of these SNPN network(s) broadcast the same PLMN ID and NID or different PLMN ID(s) and/or NID(s), which cannot match the UE's registered or selected SNPN ID including the PLMN ID and the NID).

It should be noted that the cells of the SNPN network(s), which is the UE's registered or selected SNPN(s), may be the cells belonging to the UE's registered or selected SNPN(s). The cells of the SNPN network(s), which is not the UE's registered or selected SNPN(s), may be the cells not belonging to the UE's registered or selected SNPN(s).

In some implementations, UE credentials may be owned by the (deployed) SNPN network or an entity operating the SNPN network in the area. The SNPN network may be the UE's registered or selected SNPN. In some implementations, the SNPN network may be deployed in the area where the UE is located. In some other implementations, the SNPN network may not be deployed in the area where the UE is located.

In some implementations, UE credentials may be owned by the (deployed) SNPN network or an entity operating the SNPN network in the area. The SNPN network may not be the UE's registered or selected SNPN. In some implementations, the SNPN network may be deployed in the area where the UE is located. In some other implementations, the SNPN network may not be deployed in the area where the UE is located.

In some implementations, UE credentials may be owned by the (deployed) PLMN network and/or the PNI-NPN network or an entity operating the PLMN network and/or the PNI-NPN network. In some implementations, the PLMN and/or the PNI-NPN network may be deployed in the area where the UE is located. In some other implementations, the PLMN and/or the PNI-NPN network may not be deployed in the area where the UE is located.

In some implementations, based on the potential deployment scenarios, a UE may perform a UE onboarding procedure with a network (e.g., an SNPN network, a PNI-NPN network, a PLMN network) via a cell of the network. The network or an entity of the network may not own UE's credentials. That is, the UE credentials may be owned by the network or the entity operating a network separate from the network with which the UE performs the UE onboarding procedure. The network or the entity operating the network that owns the UE credentials may be located in the same area as the UE. The network or the entity operating the network that owns the UE credentials may be located in a different area separate from the area where the UE is located. The network (e.g., SNPN network, PNI-NPN network, PLMN network) on which the UE camps and which provides an initial registration and/or access to the UE for UE onboarding may be an ON.

In some implementations, a UE may perform SNPN selection (or PLMN selection) and/or cell (re)selection to camp on a cell. The cell may belong to a network (or an entity operating the network) that does not own the UE credentials. The UE (e.g., an AS layer of the UE) may read SI (e.g., a SIB1) of the serving cell(s) or neighboring cell(s) to acquire parameters related to a UE onboarding procedure, for example, upon (receiving) a request from a NAS layer of the UE, autonomously and/or periodically. The parameters may include (but is not limited to) at least one of the following indications:

An indication indicating to the UE whether the cell (or SNPN(s) operating the cell) supports access using the credentials from a separate entity that does not operate the cell.

An indication indicating to the UE whether the network (e.g., an SNPN) allows registration attempts from UEs that are not explicitly configured to select the network (e.g., the SNPN).

An indication indicating to the UE whether the network (e.g., an SNPN) supports onboarding (e.g., support for UE onboarding indication).

In some implementations, after reading the SI (e.g., the SIB1) of the serving cell(s) or the neighboring cell(s), a lower layer (e.g., an AS layer) of the UE may forward (or report) information regarding the parameters related to the UE onboarding procedure to an upper layer (e.g., a NAS layer) of the UE. The upper layer of the UE may determine, based on the forwarded information, whether the UE is allowed to perform the UE onboarding procedure with the cell (and with the network (e.g., the SNPN) operating the cell) from which the UE receives the parameters related to the UE onboarding procedure. The upper layer of the UE may determine, based on the forwarded information, for SNPN selection (e.g., whether the UE selects the SNPN that operates the cell from which the UE receives the parameters related to the UE onboarding procedure and the SNPN that is associated with the forwarded information). In some implementations, the upper layer (e.g., the NAS layer) of the UE may further forward information regarding the upper layer determination and/or rules (e.g., prioritization rules) to the lower layer (e.g., the AS layer) of the UE.

In some implementations, after reading the SI (e.g., the SIB1) of the serving cell(s) or the neighboring cell(s), a lower layer (e.g., an AS layer) of the UE may forward (or report) information regarding the parameters related to the UE onboarding procedure to an upper layer (e.g., a NAS layer) of the UE. The lower layer (e.g., the AS layer) of the UE may determine, based on the parameters related to the UE onboarding procedure, whether the UE is allowed to perform the UE onboarding procedure with the cell (and with the network (e.g., the SNPN) operating the cell) from which the UE receives the parameters. In some other implementations, the lower layer (e.g., the AS layer) of the UE may further forward the information regarding the lower layer determination and/or rules (e.g., prioritization rules) to the upper layer (e.g., the NAS layer) of the UE.

In some other implementations, after reading the SI (e.g., the SIB1) of the serving cell(s) or the neighboring cell(s), a lower layer (e.g., an AS layer) of the UE may not forward (or report) the information regarding the parameters related to the UE onboarding procedure to an upper layer (e.g., a NAS layer) of the UE. The lower layer (e.g., the AS layer) of the UE may determine, based on the parameters related to the UE onboarding procedure, whether the UE is allowed to perform the UE onboarding procedure with the cell (and with the network (e.g., the SNPN) operating the cell) from which the UE receives the parameters. In some implementations, the lower layer (e.g., the AS layer) of the UE may further forward the information regarding the lower layer determination and/or rules (e.g., prioritization rules) to the upper layer (e.g., the NAS layer) of the UE.

In some implementations, the parameters related to the UE onboarding procedure may be the same as the information regarding the parameters related to the UE onboarding procedure. In some other implementations, the parameters related to the UE onboarding procedure may be different from the information regarding the parameters related to the UE onboarding procedure. For example, the parameters related to the UE onboarding procedure may be extracted or transformed (e.g., by the lower layer of the UE) to form the information regarding the parameters related to the UE onboarding procedure.

In some implementations, if the UE is allowed to perform the UE onboarding procedure with the cell (and with the network (e.g., the SNPN) operating the cell) from which the UE receives the parameters, the UE may perform specific action(s), such as performing an RRC Setup procedure and/or registration procedure (e.g., to enable the support for UE onboarding using default UE credentials) with the (core) network of the cell. If the UE is not allowed to perform the UE onboarding procedure with the cell (and with the network (e.g., the SNPN) operating the cell) from which the UE receives the parameters, the UE may perform other specific action(s), such as cell (re)selection and/or barring the cell.

In some implementations, the UE may consider the cell that supports the UE onboarding procedure without the UE credentials (e.g., default UE credentials, NPN credentials, UE's PLMN credentials) or that supports the UE's access using the UE credentials from a separate entity other than the selected/registered network of the UE, as a suitable cell.

That is, the UE may stay in a "camped normally" state while the UE (re)selects or camps on such a suitable cell. In other words, the criteria to determine whether a cell is suitable may include whether the cell supports the UE onboarding procedure without the UE credentials or whether the cell supports the UE's access using the UE credentials received from a separate entity (e.g., other than the selected/registered network of the UE).

In some implementations, the UE may consider the cell that supports the UE onboarding procedure without the UE's credentials (for the selected/registered network of the UE) or supports the UE's access using the UE credentials from a separate entity, as an acceptable cell. That is, the UE may stay in a "camped on any cell" state while the UE (re)selects or camps on such a cell. In other words, whether the cell supports the UE onboarding procedure without the UE's credentials or supports the UE's access using the UE credentials received from the separate entity may be one of the criteria to determine whether the cell is acceptable. It should be noted that the separate entity may be a separate entity from the selected/registered network of the UE.

In some implementations, a UE may transition from the "camped normally" state to the "camped on any cell" state while the UE reselects a cell, where the UE may not have the credentials associated with the (selected/registered) network of the cell. It should be noted that the disclosed mechanisms may be applied (only) when the UE is enabled/configured/requested (e.g., by the NAS layer of the UE, or by the CN) to connect to one (specific) network without the UE's credentials via a serving cell (or when the UE's credentials are stored in another entity separate from the network of the serving cell). In some other implementations, the UE may consider these cells as barred (for a period of time, such as a maximum of a fixed time duration, a fixed time duration, etc.). It should be noted that the UE may determine whether a cell is suitable or acceptable based on a configuration (or instruction) received from the NAS layer (e.g., whether the NAS layer requests/enables the UE to select an SNPN, which supports access without the UE's credentials).

In some implementations, the UE may trigger a cell selection procedure and/or a cell reselection procedure after the upper layer (e.g., the NAS layer) changes its indication and/or forward the changed indication to a lower layer (e.g., the AS layer). For example, the NAS layer may change its indication to enable (or disable) the UE to camp on a cell that is associated with any network (e.g., an SNPN network) that supports the UE onboarding procedure without the UE's credentials. The UE, may transition from an RRC_INACTIVE state to an RRC_IDLE state after the NAS layer of the UE changes its indication about the UE onboarding procedure without the UE's credentials (e.g., from enable to disable), and the NAS layer of the UE forwards (or provides) the changed indication to the AS layer of the UE. The NAS layer of the UE may change its indications about the UE onboarding procedure without the UE's credentials (only) while the NAS layer of the UE is (operating) in an SNPN access mode. In addition, the disclosed indications may be associated with one SNPN selection request (e.g., a request from the NAS layer of the UE to the AS layer of the UE to indicate that SNPN selection is performed (e.g., based on the forwarded indication(s))) or may be associated with one target network ID (e.g., an SNPN ID, PLMN ID, NID CAG ID, PNI-NPN ID) (e.g., allows/enables the UE to start the UE onboarding procedure with the target network ID with or without UE credentials). The NAS layer of the UE may forward, to the AS layer of the UE, the target network ID and the associated indication together. The target network ID may be any network ID determined by the NAS layer of the UE, or the selected/registered network ID. In some implementations, the NAS layer of the US may forward its indication about the UE onboarding procedure after the SNPN selection is performed (e.g., completed).

SI Reception

In some implementations, a cell of a deployed network may broadcast parameters related to a UE onboarding procedure periodically or on-demand. If the parameters related to the UE onboarding procedure are broadcast on-demand (e.g., after requested by a UE), the cell may broadcast once, several times (e.g., based on a specific number of times), or periodically. For example, the cell may transmit the parameters related to the LT, onboarding procedure via dedicated signaling (e.g., in an RRC message) to the UE, after the UE requests the parameters related to the UE onboarding procedure.

In some implementations, the cell of the deployed network may transmit the parameters related to the UE onboarding procedure via SI (e.g., an MIB, SIB1, SIB related to cell (re)selection (e.g., SIB2, SIB3, SIB4, SIB5), SIB related to NPN (e.g., SIB10), SIB related to the UE onboarding procedure (e.g., a new SIB)) or via dedicated signaling (e.g., in an RRC message) to the UE. For example, when the UE is in an RRC_IDLE/RRC_INACTIVE/RRC_CONNECTED state, the UE may receive the parameters related to the UE onboarding procedure by reading (or acquiring) the SI from the cell. For example, when the UE is in an RRC_INACTIVE/RRC_CONNECTED state, the UE may receive the parameters related to the UE onboarding procedure by receiving the dedicated signaling (e.g., the RRC message) from the cell.

In some implementations, the parameters related to the UE onboarding procedure may include (but are not limited to) at least one of the following indications:

An indication indicating to the UE whether the cell (or SNPN(s) operating the cell) supports access using credentials from a separate entity that does not operate the cell.

An indication indicating to the UE whether the network (e.g., an SNPN) allows registration attempts from UEs that are not explicitly configured to select the network (e.g., the SNPN).

An indication indicating to the UE whether the network (e.g., an SNPN) supports onboarding (e.g., support for UE onboarding indication).

Details of an indication indicating to the UE whether the cell (or SNPN(s) operating the cell) supports access using credentials from a separate entity that does not operate the cell may be described as follows.

In some implementations, the indication (e.g., a field in a SIB1) indicating (or informing) to the UE whether the cell (or SNPN(s) operating the cell) supports access using credentials from a separate entity (e.g., a credential holder) that does not operate the cell may be a Boolean indicator, in an ENUMERATED {"true"} format, in an ENUMERATED {"support"} format, or in an ENUMERATED {"supported", "notSupported"} format. For example, if the indicator is (set to) "1", "true", or "supported", the cell may indicate that it supports access using credentials from a separate entity. The UE may determine that the cell (or SNPN(s) operating the cell or the SNPN operating the cell and being associated with the indicator) supports access using credentials from a separate entity based on the received indicator. If the indicator is absent, "0", or "notSupported", the cell may indicate that it does not support access using credentials from a separate entity. The UE may determine that the cell (or SNPN(s) operating the cell or the SNPN operating the cell and being associated with the indicator) does not support access using credentials from a separate entity based on the received indicator. In some implementations, the indication indicating (or informing) to the UE whether the cell (or SNPN(s) operating the cell) supports access using credentials from a separate entity (e.g., a credential holder) that does not operate the cell may be a field in a SIB1.

In some implementations, the indication (e.g., a field in a SIB1) indicating (or informing) to the UE whether the cell (or SNPN(s) operating the cell) supports access using credentials from a separate entity (e.g., a credential holder) that does not operate the cell may be broadcast (or transmitted) by the cell per network/entity (e.g., per SNPN, per PNI-NPN, per PLMN, per PLMN ID, per CAG ID, per NID), or per group ID. For each transmitted (e.g., broadcast) network/entity ID (e.g., an SNPN ID, PNI-NPN ID, PLMN ID, CAG ID, NID) or a group ID, the cell may transmit the associated indication to indicate to the UE whether the cell (or SNPN(s) operating the cell or the network/entity/group identified by the corresponding network/entity/group ID and operating the cell) supports access using credentials from a separate entity that does not operate the cell. For example, the cell of the network indicating the group ID to the UE may support any UEs whose credentials are owned by any of the separate network/entity associated with the group ID, authentication, authorization, UE onboarding, and/or (remote) provisioning. The UE may be (pre)configured with the group ID. If (or once) the UE receives from the cell the indication indicating to the UE whether the cell (or SNPN(s) operating the cell or the network/entity/group identified by the corresponding network/entity/group ID and operating the cell) supports access using credentials from (1) a separate entity and/or (2) the associated network/entity IDs that associate with the UE's (pre)configured group ID and/or (3) the group ID that is (pre)configured to the UE, the UE may determine whether the cell allows the UE to access based on the indication that indicates to the UE whether the cell supports access using credentials from a separate entity. It should be noted that the cell described above may represent (or be substituted by) SNPN(s) operating the cell, or the network/entity/group identified by the corresponding network/entity/group ID and operating the cell.

In some implementations, the UE may receive, from the cell, at least one network/entity ID (e.g., an SNPN ID, PNI-NPN ID, PLMN ID, CAG ID, NID) and/or a group ID per the indication indicating to the UE whether the cell (or SNPN(s) operating the cell or the network/entity/group identified by the corresponding network/entity/group ID and operating the cell) supports access using credentials from a separate entity that does not operate the cell. In some implementations, the UE may receive, from the cell, at least one network/entity ID (e.g., the SNPN ID, PNI-NPN ID, PLMN ID, CAG ID, NID) and/or the group ID of the same type of network/entity (e.g., the SNPN is one type, PNI-NPN is one type, PLMN is one type, NPN is one type) per the indication that indicates to the UE whether the cell (or SNPN(s) operating the cell or the network/entity/group identified by the corresponding network/entity/group ID and operating the cell) supports access using credentials received from a separate entity that does not operate the cell. It should be noted that the network/entity ID or the group ID may be associated with a corresponding indication that indicates to the UE whether the cell (or SNPN(s) operating the cell or the network/entity/group identified by the corresponding network/entity/group ID and operating the cell) supports access using credentials received from a separate entity. The group ID may identify a group of networks. The UE may be (pre)configured with at least one group ID. When the UE receives a group ID matching its (pre)configured group ID, the UE may perform, based on the indication indicating to the UE whether the cell (or SNPN(s) operating the cell or the network/entity/group identified by the corresponding network/entity/group ID and operating the cell) supports access using credentials from a separate entity that associates with the group ID, the access to the cell using the credentials from the separate entity associated with the group ID.

In some implementations, if the indicator is "1", "true", or "supported", the cell may indicate that the cell (or SNPN(s) operating the cell or the network/entity/group identified by the corresponding network/entity/group ID and operating the cell) supports access using credentials from a separate entity, which is identified by the associated transmitted (e.g., broadcast) network/entity ID and/or a group ID. In some implementations, the cell (or SNPN(s) operating the cell or the network/entity/group identified by the corresponding network/entity/group ID and operating the cell) may not support access using credentials from a separate entity, which is identified by other network/entity IDs (e.g., rather than the associated transmitted (e.g., broadcast) network/entity IDs) and/or which is identified by other group ID(s) (e.g., rather than the associated transmitted (e.g., broadcast) group ID(s)). The UE may determine that the cell (or SNPN(s) operating the cell or the network/entity/group identified by the corresponding network/entity/group ID and operating the cell) supports access using credentials from a separate entity, which is identified by the associated transmitted (e.g., broadcast) network/entity ID and/or the group ID, based on the received indicator and the associated transmitted network/entity ID and/or the group ID. In some implementations, the UE may determine that the cell (or SNPN(s) operating the cell or the network/entity/group identified by the corresponding network/entity/group ID and operating the cell) does not support access using credentials from a separate entity, which is identified by other network/entity IDs (e.g., rather than the associated transmitted (e.g., broadcast) network/entity IDs) and/or which is identified by other group ID(s) (e.g., rather than the associated transmitted (e.g., broadcast) group ID(s)).

In some implementations, if the indicator is absent, "0", or "notSupported", the cell may indicate that the cell (or SNPN(s) operating the cell or the network/entity/group identified by the corresponding network/entity/group ID and operating the cell) does not support access using credentials from a separate entity, which is identified by the associated transmitted (e.g., broadcast) network/entity ID and/or group ID. In some implementations, the cell (or SNPN(s) operating the cell or the network/entity/group identified by the corresponding network/entity/group ID and operating the cell) may support access using credentials from a separate entity, which is identified by other network/entity IDs (e.g., rather than the associated transmitted (e.g., broadcast) network/entity IDs) and/or which is identified by other group ID(s) (e.g., rather than the associated transmitted (e.g., broadcast) group ID(s)). The UE may determine that the cell (or SNPN(s) operating the cell or the network/entity/group identified by the corresponding network/entity/group ID and operating the cell) does not support access using credentials from a separate entity, which is identified by the associated transmitted (e.g., broadcast) network/entity ID and/or group ID, based on the received indicator and the associated transmitted network/entity ID. In some implementations, the UE may determine that the cell (or SNPN(s)) operating the cell or the network/entity/group identified by the corresponding network/entity/group ID and operating the cell) supports access using credentials from a separate entity, which is identified by other network/entity IDs (e.g., rather than the associated transmitted (e.g., broadcast) network/entity ID) and/or which is identified by other group ID(s) (e.g., rather than the associated transmitted (e.g., broadcast) group ID(s)).

Details of an indication indicating to the UE whether the network (e.g., an SNPN) allows registration attempts from UEs that are not explicitly configured to select the network (e.g., the SNPN) may be described as follows.

In some implementations, the indication (e.g., a field in a SIB1) indicating (or informing) to the UE, whether the network (e.g., an SNPN, PLMN, NPN, PNI-NPN) allows the registration attempts from UEs that are not explicitly configured to select the (same) network (e.g., the SNPN, PLMN, NPN, PNI-NPN) may be a Boolean indicator, in an ENUMERATED {"true"} format, in an ENUMERATED {"allowed"} format, or in an ENUMERATED {"allowed", "notAllowed"} format. For example, if the indicator is (set to) "1", "true", or "allowed", the cell may indicate that the network allows registration attempts from UEs that are not explicitly configured to select the network. If the indicator is absent, "0", or "notAllowed", the cell may indicate that the network does not allow registration attempts from UEs that are not explicitly configured to select the network. In some implementations, the indication indicating (or informing) the UE whether the network (e.g., an SNPN, PLMN, NPN, PNI-NPN) allows the registration attempts from UEs that are not explicitly configured to select the (same) network (e.g., the SNPN, PLMN, NPN, PNI-NPN) may be a field in a SIB1.

In some implementations, the indication (e.g., a field in a SIB1) indicating (or informing) to the UE whether the network (e.g., an SNPN, PLMN, NPN, PNI-NPN) allows the registration attempts from UEs that are not explicitly configured to select the (same) network (e.g., the SNPN, PLMN, NPN, PNI-NPN) may be broadcast (or transmitted) by the cell of the network per network/entity (e.g., per SNPN, per PNI-NPN, per PLMN, per PLMN ID, per CAG ID, per NID) or per group ID. For each transmitted (e.g., broadcast) network/entity ID (e.g., an SNPN ID, PNI-NPN ID, PLMN ID, CAG ID, NID) and/or a group ID, the cell may transmit the associated indication that indicates to the UE whether the network, identified by the associated network/entity (ID) and/or the group ID, allows registration attempts from UEs that are not explicitly configured to select the network. For example, the cell of the network indicating the group ID to the UE may support any UEs whose credentials are owned by any of the separate network/entity associated with the group ID and/or which are not explicitly configured to select the network identified by the group ID, authentication, authorization, UE onboarding, and/or (remote) provisioning. The UE may be (pre)configured with the group ID. If (or once) the LTE receives from the cell the indication that indicates to the UE whether the network allows registration attempts from UEs that are not explicitly configured to select the network and/or the associated network/entity IDs that associate with the UE's (pre)configured group ID and/or the group ID that is (pre)configured to the UE, the UE may determine whether the cell allows the UE to access based on the indication that indicates to the UE whether the network allows registration attempts from UEs that are not explicitly configured to select the network.

In some implementations, the UE may receive, from the cell, at least one network/entity ID (e.g., an SNPN ID, PNI-NPN ID, PLMN ID, CAG ID, NID) and/or a group ID per the indication indicating to the UE whether the network allows registration attempts from UEs that are not explicitly configured to select the network. In some implementations, the UE may receive, from the cell, at least one network/entity ID (e.g., the SNPN ID, PNI-NPN ID, PLMN ID, CAG ID, NID) and/or the group ID of the same type of network/entity (e.g., the SNPN is one type, PNI-NPN is one type, PLMN is one type, NPN is one type) per the indication indicating to the UE whether the network allows registration attempts from UEs that are not explicitly configured to select the network. It should be noted that the network/entity ID or group ID may be associated with a corresponding indication indicating to the UE whether the network allows registration attempts from UEs that are not explicitly configured to select the network. The group ID may identify a group of networks. The UE may be (pre)configured with at least one group ID. When the UE receives a group ID matching its (pre)configured group ID, the UE may perform based on the indication that indicates to the UE whether the network allows registration attempts from UEs that are not explicitly configured to select the network that associates with the group ID.

In some implementations, if the indicator is "1", "true", or "allowed", the cell may indicate that the network/entity/group allows registration attempts from UEs that are not explicitly configured to select the network/entity/group, which is identified by the associated transmitted (e.g., broadcast) network/entity ID and/or a group ID. In some implementations, the network/entity/group may not allow registration attempts from UEs that are not explicitly configured to select the network/entity/group, which is identified by other network/entity IDs (e.g., rather than the associated transmitted (e.g., broadcast) network/entity IDs) and/or which is identified by other group ID(s) (e.g., rather than the associated transmitted (e.g., broadcast) group ID(s)). The UE may determine that the network/entity/group allows registration attempts from UEs that are not explicitly configured to select the network/entity/group, which is identified by the associated transmitted (e.g., broadcast) network/entity ID and/or group ID, based on the received indicator and the associated transmitted network/entity ID and/or group ID. In some implementations, the UE may determine that the network/entity/group does not allow registration attempts from UEs that are not explicitly configured to select the network/entity/group, which is identified by other network/entity IDs (e.g., rather than the associated transmitted (e.g., broadcast) network/entity IDs) and/or which is identified by other group ID(s) (e.g., rather than the associated transmitted (e.g., broadcast) group ID(s)).

In some implementations, if the indicator is absent, "0", or "notAllowed", the cell may indicate that the network/entity/group does not allow registration attempts from UEs that are not explicitly configured to select the network/entity/group, which is identified by the associated transmitted (e.g., broadcast) network/entity ID and/or a group ID. In some implementations, the network/entity/group may allow registration attempts from UEs that are not explicitly configured to select the network/entity/group, which is identified by other network/entity IDs (e.g., rather than the associated transmitted (e.g., broadcast) network/entity IDs) and/or which is identified by other group ID(s) (e.g., rather than the associated transmitted (e.g., broadcast) group ID(s)). The UE may determine that the network/entity/group does not allow registration attempts from UEs that are not explicitly configured to select the network/entity/group, which is identified by the associated transmitted (e.g., broadcast) network/entity ID and/or group ID, based on the received indicator and the associated transmitted network/entity ID and/or group ID. In some implementations, the UE may determine that the network/entity/group allows registration attempts from UEs that are not explicitly configured to select the network/entity/group, which is identified by other network/entity IDs (e.g., rather than the associated transmitted (e.g., broadcast) network/entity ID) and/or which is identified by other group ID(s) (e.g., rather than the associated transmitted (e.g., broadcast) group ID(s)).

Details of an indication that indicates to the UE whether the network (e.g., an SNPN) supports onboarding (e.g., support for UE onboarding indication) may be described as follows.

In some implementations, the indication (e.g., a field in a SIB1) indicating to (or informing) the UE whether the network (e.g., an SNPN) supports onboarding (e.g., support for UE onboarding indication) may be a Boolean indicator, in an ENUMERATED {"true"} format, in an ENUMERATED {"support"} format, or in an ENUMERATED {"supported", "notSupported"} format. For example, if the indicator is (set to) "1", "true", or "supported", the cell may indicate, to the UE and/or to a CN (e.g., an AMF, an SMF), that the network supports UE onboarding (e.g., especially with default UE credentials). The UE may determine that the network supports the UE onboarding (e.g., especially with default UE credentials) based on the received indicator. The CN may determine that the connected cell (and the network (e.g., the SNPN) operating the connected cell) supports the UE onboarding (e.g., especially with default UE credentials) based on the received indicator so that the CN may further select a CN entity (e.g., an AMF, an SMF) capable of and responsible for a UE onboarding procedure (e.g., especially with default UE credentials). If the indicator is absent, "0", or "notSupported", the cell may indicate, to the UE and/or to the CN, that the network does not support the UE onboarding (e.g., especially with default UE credentials). The UE may determine that the network does not support the UE onboarding (e.g., especially with default UE credentials) based on the received indicator. The CN may determine that the connected cell (and the network (e.g., the SNPN) operating the connected cell) does not support the UE onboarding (e.g., especially with default UE credentials) based on the received indicator so that the CN does not (need to) select a CN entity capable of and responsible for a UE onboarding procedure (e.g., especially with default UE credentials). That is, the support for the UE onboarding indication may be used for an AMF selection.

In some implementations, a cell/network (e.g., an SNPN, a BS) may receive, from the CN (e.g., a default AMF, an AMF connected with the UE), information about the UE onboarding support capability of the CN. For example, after receiving the information indicating that the UE onboard support capability is not supported by the CN, the cell/network may indicate that it does not support the UE onboarding (e.g., especially with default UE credentials) to the UE, (e.g., by transmitting the support for UE onboarding indication to the UE). After receiving the information indicating that the UE onboarding support capability is supported by the CN, the cell/network may indicate that it supports the UE onboarding (e.g., especially with default UE credentials) to the UE (e.g., by transmitting the support for UE onboarding indication to the UE). In some implementations, the indication indicating to (or informing) the UE whether the network (e.g., an SNPN) supports onboarding (e.g., support for UE onboarding indication) may include a field, for example, in a SIB1.

In some implementations, the support for UE onboarding indication may be transmitted, to the CN (e.g., a default AMF) via an NG interface (e.g., an NG-C interface if to the AMF, an NG-U interface if to the UPF), by the cell per network entity (e.g., per SNPN, per PNI-NPN, per PLMN, per PLMN ID, per CAG ID, per NID), or per group ID. For each transmitted network/entity ID (e.g., an SNPN ID, PNI-NPN ID, PLMN ID, CAG ID, NID) or a group ID, the cell may transmit the associated indication to indicate to the UE whether the network/entity/group supports UE onboarding (e.g., especially with default UE credentials). For example, the cell of the network indicating the group ID to the CN may support any UEs whose credentials are owned by any of the separate network/entity associated with the group ID, authentication, authorization, UE onboarding, and/or (remote) provisioning. If (or once) the CN receives from the cell the support for UE onboarding indication and/or the associated network/entity IDs that associate with the UE's (pre)configured group ID and/or the group ID that is (pre)configured to the UE (e.g., by the CN), the CN may determine whether the network supports UE onboarding or whether the network (or the cell) is intended for UE onboarding, based on the the support for UE onboarding indication. After the determination, the CN may further select an appropriate network entity (e.g., an AMF supporting UE onboarding, especially with default UE credentials) to handle the UE onboarding procedure.

In some implementations, the CN (e.g., a default AMF) may receive, from the cell via an NG interface (e.g., an NG-C interface if to the AMF, an NG-U interface if to the UPF), at least one network/entity ID (e.g., an SNPN ID, PNI-NPN ID, PLMN ID, CAG ID, NID) and/or a group ID per the indication that indicates to the UE whether the network supports UE onboarding (e.g., especially with default UE credentials). In some implementations, the CN (e.g., a default AMF) may receive, from the cell via an NG interface (e.g., an NG-C interface if to the AMF, an NG-U interface if to the UPF), at least one network/entity ID (e.g., an SNPN ID, PNI-NPN ID, PLMN ID, CAG ID, NID) and/or a group ID of the same type of network/entity (e.g., the SNPN is one type, PNI-NPN is one type, PLMN is one type, NPN is one type) per the indication that indicates to the UE whether the network supports UE onboarding. It should be noted that the network/entity ID or the group ID may be associated with the corresponding indication that indicates to the UE whether the network supports UE onboarding. If (or once) the CN receives from the cell the support for UE onboarding indication and/or the associated network/entity IDs that associate with the UE's (pre)configured group ID and/or the group ID that is (pre)configured to the UE (e.g., by the CN), the CN may determine whether the cell supports UE onboarding or whether the cell is intended for UE onboarding, based on the the support for UE onboarding indication. After the determination, the CN may further select an appropriate network entity (e.g., an AMF supporting UE onboarding, especially with default UE credentials) to handle the UE onboarding procedure.

In some implementations, if the indicator is "1", "true", or "supported", the cell may indicate to the CN that the network supports the UE onboarding. In some implementations, if the indicator is "1", "true" or "supported" and the indicator is associated with a network/entity ID or a Group ID, the cell may indicate to the CN that the network/entity/ group supports UE onboarding for the corresponding network/entity/group identified by the network/entity ID and/or group ID.

In some implementations, if the indicator is absent, "0", or "notSupported", the cell may indicate that the network does not support UE onboarding. In some implementations, if the indicator is "0" or "notSupported" and the indicator is associated with a network/entity ID or a group ID, the cell may indicate to the CN that the network/network/entity does not support the UE onboarding for the corresponding network/entity/group identified by the network/entity ID and/or group ID.

In some implementations, the indication that indicates to the UE whether the cell (or SNPN(s) operating the cell or the SNPN operating the cell and being associated with the indicator) supports access using credentials from a separate entity that does not operate the cell and the support for the UE onboarding indication may be the same indication. In some other implementations, the indication that indicates to the UE whether the cell (or SNPN(s) operating the cell or the SNPN operating the cell and being associated with the indicator) supports access using credentials from a separate entity that does not operate the cell and the support for the UE, onboarding indication may be separate indications.

In some implementations, the indication that indicates to the UE whether the network (e.g., an SNPN) allows registration attempts from UEs that are not explicitly configured to select the network (e.g., the SNPN) and the support for UE onboarding indication may be the same indication. In some other implementations, the indication that indicates to the UE whether the network (e.g., an SNPN) allows registration attempts from UEs that are not explicitly configured to select the network (e.g., the SNPN) and the support for UE onboarding indication may be separate indications.

Cross-Layer Interaction

In some implementations, when a cell indicates that the cell (or SNPN(s) operating the cell or the SNPN operating the cell and being associated with the indicator) supports access using credentials from a separate entity that does not operate the cell corresponding to the associated network/entity, it may represent that the cell (or SNPN(s) operating the cell or the SNPN operating the cell and being associated with the indicator) supports access using credentials from a separate entity, where the separate entity is identified by the associated network/entity. After receiving the indication from the cell, the indication may represent whether the access using credentials from a separate entity is supported or not, and the UE may further check whether its credentials are provided by the associated network/entity.

In some implementations, an AS layer of the UE may report (or send) a first indication to a NAS layer of the UE for requesting information of the network/entity that provides the credentials. The first indication may be a one-bit indicator (e.g., "1" representing requesting), may be an index regarding the received associated network/entity, or may be the received associated network/entity ID. Then, the AS layer of the UE may receive a second indication from the NAS layer of the UE. The second indication may include information indicating whether the credentials are provided by the associated network/entity and/or information regarding the network/entity (ID) that provides the credentials.

In some implementations, when the AS layer of the UE has information regarding which network/entity that provides the credentials, the AS layer of the UE may not inform the NAS layer of the UE. The AS layer of the UE may determine whether the credentials are provided by the received associated network/entity.

In some implementations, when the AS layer of the UE has information regarding which network/entity that provides the credentials, the AS layer of the UE may indicate the information to (e.g., the result of AS determination) the NAS layer of the UE. For example, the AS layer of the UE may determine whether the credentials are provided by the received associated network/entity and inform the result of the determination to the NAS layer of the UE.

In some implementations, during the NAS determination or AS determination, the NAS layer may further inform the UE of the prioritization information. The prioritization information may be a priority value for the cell where the UE receives the indication. The UE may apply the priority value during cell (re)selection.

In some implementations, during the NA S determination or AS determination, the NAS layer may further inform the AS layer of the UE of the required information for the UE to perform a registration procedure, a UE onboarding procedure and/or a (remote) provisioning procedure. The required information may include a UE ID, an associated network/entity ID, prioritization information, a selected/registered network ID (e.g., a selected/registered PLMN ID, selected/registered SNPN ID) and/or a selected/allowed group ID. The UE may encapsulate the required information included in a NAS message into an RRC message. The UE (e.g., the AS layer of the UE) may transmit the RRC message including the NAS message to the cell during the registration procedure, the UE onboarding procedure, the RRC procedure (e.g., an RRC Setup procedure, RRC Resume procedure) and/or the (remote) provisioning procedure.

In some implementations, after receiving the indication indicating that the access using credentials front a separate entity is not supported, the UE may not further check whether its credentials are provided by the associated network/entity. The UE may ignore the indication.

In some implementations, after the UE determination, the outcome may include that (1) the UE has the credential from a separate entity, which is associated with the received network/entity/group ID, and (2) the UE does not have the credential front a separate entity, which is associated with the received network/entity/group ID. It should be noted that the UE determination may be executed after (or before) the UE receives, from the cell, the indication that indicates to the UE whether the cell (or SNPN(s) operating the cell or the SNPN operating the cell and being associated with the indicator) supports access using credentials from a separate entity.

In some implementations, when a cell indicates that the network allows registration attempts from UEs that are not explicitly configured to select the network, it may represent that the network allows registration attempts from UEs that are not explicitly configured to select the network, which is identified by the associated transmitted (e.g., network/entity ID). After receiving the indication from the cell. The indication may represent whether the registration attempts from UEs that are not explicitly configured to select the network is allowed or not, the UE may further check whether it is explicitly configured to select the network identified by the associated network/entity.

In some implementations, the AS layer of the UE may report (or send) a third indication to the NAS layer of the UE for requesting information indicating whether the UE is explicitly configured to select the network/entity identified by the received associated network/entity. The third indication may be a one-bit indicator (e.g., "1" represents requesting), may be an index regarding the received associated network/entity, or may be the received associated network/entity ID. Then, the AS layer of the UE may receive a fourth indication from the NAS layer of the UE. The fourth indication may include information indicating whether the UE is explicitly configured to select the network/entity identified by the received associated network/entity and/or information regarding the network/entity (ID) that the UE is explicitly configured to select.

In some implementations, when the AS layer of the UE has the information regarding which network/entity that the UE is explicitly configured to select and/or the information indicating whether the UE, is explicitly configured to select the network/entity, the AS layer of the UE may not indicate the information to the NAS layer of the UE. The AS layer of the UE may determine whether the UE is explicitly configured to select the network/entity identified by the associated network/entity.

In some implementations, when the AS layer of the UE has the information regarding which network/entity that the UE is explicitly configured to select and/or the information indicating whether the UE is explicitly configured to select the network/entity, the AS layer of the UE may indicate the information to the NAS layer of the UE (e.g., the result of AS determination). For example, the AS layer of the UE may determine whether the UE is explicitly configured to select the network/entity identified by the associated network/entity and indicate the result of the determination to the NAS layer of the UE.

In some implementations, during the NAS determination or AS determination, the NAS layer of the UE may further inform the AS layer of the UE of the prioritization information. The prioritization information may be a priority value for the cell where the UE receives the indication. The UE may apply the priority value during cell (re)selection.

In some implementations, during the NAS determination or AS determination, the NAS layer of the UE may further report (or provide) a switch indicator to the AS layer of the UE. The switch indicator may be used to enable, disable, allow, or not allow the UE to select and/or camp on the cell. The switch indicator may be used to enable, disable, allow, or not allow the UE to select/register the network of the cell. In addition to the switch indicator, the NAS layer of the UE may further report (or provide) a network ID (e.g., an SNPN ID, PLMN ID, CAG ID, PNI-NPN ID, NID, selected/registered SNPN ID, selected/registered PLMN ID) optionally together with the switch indicator to the AS layer of the UE.

If the AS layer of the UE receives the network ID and the switch indicator together from the NAS layer of the UE, and if the switch indicator represents "enable" or "allow", the UE may select and/or camp on the cell operated by a network indicated by the network ID.

If the AS layer of the UE receives the network ID and the switch indicator together from the NAS layer of the UE, and if the switch indicator represents "disable" or "not allow", the UE may neither select nor camp on the cell operated by a network indicated by the network ID. In some implementations, the UE may further bar such a cell.

If the AS layer of the UE receives the switch indicator (e.g., without receiving the network ID), and if the switch indicator means "enable" or "allow", the UE may select and/or camp on the serving cell where the UE receives at least one of the indication that indicates to the UE whether the cell (or SNPN(s) operating the cell or the SNPN operating the cell and being associated with the indicator) supports access using credentials from a separate entity that does not operate the cell, the indication that indicates to the UE whether the network (e.g., an SNPN) allows registration attempts from UEs that are not explicitly configured to select the network (e.g., the SNPN), and the indication that indicates to the UE whether the network (e.g., an SNPN) supports onboarding (e.g., support for UE onboarding indication).

If the AS layer of the UE receives the switch indicator (e.g., without receiving the network ID), and if the switch indicator means "disable" or "not allow", the UE, may neither select nor camp on the serving cell where the UE receives at least one of the indication that indicates to the UE whether the cell (or SNPN(s) operating the cell or the SNPN operating the cell and being associated with the indicator) supports access using credentials from a separate entity that does not operate the cell, the indication that indicates to the UE whether the network (e.g., an SNPN) allows registration attempts from UEs that are not explicitly configured to select the network (e.g., the SNPN), and the indication that indicates to the UE whether the network (e.g., an SNPN) supports onboarding (e.g., support for UE onboarding indication).

In some implementations, during the NAS determination or AS determination, the NAS layer of the UE may further report the AS layer of UE required information for the UE to perform a registration procedure, a UE onboarding procedure and/or a (remote) provisioning procedure. The required information may include (but is not limited to) a UE ID, an associated network/entity ID, prioritization information, a selected/registered network ID (e.g., a selected/registered PLMN ID, a selected/registered SNPN ID) and/or a selected/allowed group ID. The UE may encapsulate the required information included in a NAS message into an RRC message. The UE (e.g., the AS layer of the UE) may transmit the RRC message including the NAS message to the cell during the registration procedure, the UE onboarding procedure, the RRC procedure (e.g., an RRC Setup procedure, RRC Resume procedure) and/or the (remote) provisioning procedure.

In some implementations, after receiving the indication indicating that the registration attempts from UEs that are not explicitly configured to select the network is not allowed, the UE may not further check whether it is explicitly configured to select the network identified by the associated network/entity. The UE may ignore the indication.

In some implementations, after the UE determination, the outcome may include that (1) the UE is explicitly configured to select the network, which is associated with the received network/entity/group ID, and (2) the UE is not explicitly configured to select the network, which is associated with the received network/entity/group ID. It should be noted that the UE determination may be executed after (or before) the UE receives, from the cell, the indication that indicates to the UE whether the cell (or the network (e.g., an SNPN) operating the cell) allows registration attempts from UEs that are not explicitly configured to select the network (e.g., the SNPN).

In some implementations, the AS layer of the UE may receive the support for UE onboarding indication from the cell when the NAS layer (or upper layer) of the UE indicates to (or informs) the AS layer of the UE a request/demand on performing a UE onboarding procedure. The AS layer of the UE may ignore the support for UE onboarding indication from the cell when the NAS layer (or upper layer) of the UE does not indicate to the AS layer of the UE a request/demand on performing the UE onboarding procedure.

In some implementations, after receiving the support for UE onboarding indication from the cell, the AS layer of the UE may further report (or provide) the support for UE onboarding indication to the NAS layer of the UE regardless of content of the support for UE onboarding indication. The NAS layer of the UE may determine whether the cell (or the network (e.g., an SNPN) operating the cell or the SNPN operating the cell and being associated with the indication) supports the UE onboarding based on the received indication. If the NAS layer of the UE determines that the cell (or the network (e.g., an SNPN) operating the cell or the SNPN operating the cell and being associated with the indication) supports the UE onboarding, the NAS layer of the UE may further indicate to the AS layer of the UE an indication of performing the UE onboarding procedure and/or report (or provide) the required information for the UE onboarding procedure (e.g., selected/registered network IDs, UE's credentials) to the AS layer of the UE. In some implementations, if the NAS layer of the UE determines that the cell (or the network (e.g., an SNPN) operating the cell or the SNPN operating the cell and being associated with the indication) does not support the UE onboarding, the NAS layer of the UE may indicate to the AS layer an indication of not performing the UE onboarding procedure via the cell. In some other implementations, if the NAS layer of the UE determines that the cell (or the network (e.g., an SNPN) operating the cell or the SNPN operating the cell and being associated with the indication) does not support the UE onboarding, the NAS layer of the UE may not indicate to the AS layer an indication of not performing the UE onboarding procedure via the cell.

In some implementations, the AS layer of the UE may indicate to the NAS layer of the UE that the cell (or the network (e.g., an SNPN) operating the cell or the SNPN operating the cell and being associated with the indication) does not support the LTE onboarding procedure (e.g., especially with default UE credentials) based on the presence of the support for onboarding indication.

In some implementations, after the UE receives the support for UE onboarding indication from the cell, the AS layer of the UE may report (or provide) the support for UE onboarding indication to the NAS layer of the UE when the AS layer of the UE determines that the cell (or the network (e.g., an SNPN) operating the cell) supports the UE onboarding procedure (e.g., especially with default UE credentials) based on the support of onboarding indication. The NAS layer of the UE may further indicate to the AS layer of the UE an indication of performing the UE onboarding procedure and/or report (or provide) the required information for the UE onboarding procedure (e.g., selected/registered network IDs, UE's credentials) to the AS layer of the UE.

In some implementations, the UE may receive (but is not limited to) at least one of (1) an indication that indicates to the UE whether the cell (or SNPN(s) operating the cell or the SNPN operating the cell and being associated with the indication) supports access using credentials from a separate entity that does not operate the cell, (2) an indication that indicates to the UE whether the network (e.g., an SNPN or the SNPN operating the cell and being associated with the indication) allows registration attempts from UEs that are not explicitly configured to select the network (e.g., the SNPN or the SNPN operating the cell and being associated with the indication), and (3) an indication that indicates to the UE whether the network (e.g., an SNPN or the SNPN operating the cell and being associated with the indication) supports onboarding (e.g., support for UE onboarding indication), in one signaling (e.g., in the same SIB, in the same RRC message) simultaneously or in separate signalings (e.g., in different SIB, in different RRC message, in the same SIB, in the same RRC message) at different timing. In some implementations, the UE determination for one indication may be performed by the UE once the UE receives the corresponding indication. In some other implementations, the UE determination for one indication may be performed by the UE once the UE receives all the at least one indication.

UE AS Behavior

In some implementations, after a UE receives the indication(s) (e.g., an indication that indicates to the UE whether the cell (or SNPN(s) operating the cell or the SNPN operating the cell and being associated with the indication) supports access using credentials from a separate entity that does not operate the cell, an indication that indicates to the UE whether the network (e.g., an SNPN or the SNPN operating the cell and being associated with the indication) allows registration attempts from the UEs that are not explicitly configured to select the network (e.g., the SNPN or the SNPN operating the cell and being associated with the indication) and/or determination by an AS layer of the UE and/or determination by a NAS layer of the UE), one of the following cases may occur:

Case 1: The cell (or SNPN(s) operating the cell or the SNPN operating the cell and being associated with the indication) supports access using credentials from the separate entity, and the UE has a credential from the separate entity.

Case 2: The cell (or SNPN(s) operating the cell or the SNPN operating the cell and being associated with the indication) supports access using credentials from the separate entity, and the UE does not have a credential from the separate entity.

Case 3: The cell (or SNPN(s) operating the cell or the SNPN operating the cell and being associated with the indication) does not support access using credentials from the separate entity, and the UE has a credential from the separate entity.

Case 4: The cell (or SNPN(s) operating the cell or the SNPN operating the cell and being associated with the indication) does not support access using credentials from the separate entity, and the UE does not have a credential from the separate entity.

Case 5: The network (e.g., the SNPN or the SNPN operating the cell and being associated with the indication) allows registration attempts from UEs that are not explicitly configured to select the network (e.g., the SNPN or the SNPN operating the cell and being associated with the indication), and the UE is explicitly configured to select the network.

Case 6: The network (e.g., the SNPN or the SNPN operating the cell and being associated with the indication) allows registration attempts from UEs that are not explicitly configured to select the network (e.g., the SNPN or the SNPN operating the cell and being associated with the indication), and the UE is not explicitly configured to select the network.

Case 7: The network (e.g., the SNPN or the SNPN operating the cell and being associated with the indication) does not allow registration attempts from UEs that are not explicitly configured to select the network (e.g., SNPN or the SNPN operating the cell and being associated with the indication), and the UE is explicitly configured to select the network.

Case 8: The network (e.g., the SNPN or the SNPN operating the cell and being associated with the indication) does not allow registration attempts from UEs that are not explicitly configured to select the network (e.g., SNPN or the SNPN operating the cell and being associated with the indication), and the UE is not explicitly configured to select the network.

In some implementations, the situation that the UE is not explicitly configured to select the network may include a situation that the UE is implicitly configured to select the network and a situation that the UE is not configured to select the network. It should be noted that a combination of the two situations may exist.

In some implementations, based on the received indication(s) from the cell and/or the determination made by the UE (e.g., by the NAS layer of the UE, by the AS layer of the UE), the UE may perform (but is not limited to) at least one of the following actions:

Perform a cell (re)selection procedure. For example, the UE may treat the cell where the UE receives the indication(s) as a candidate cell for cell (re)selection.

Bar the cell. For example, the UE may consider the cell where the UE receives the indication(s) as barred for a fixed duration (e.g., 300 seconds (s)).

Bar the cell. For example, the UE may consider the cell where the UE receives the indication(s) as barred until an SNPN/PLMN is reselected, an RAT is reselected, or a de-registration procedure is performed.

Ignore the indication(s). For example, the UE may ignore the indication(s) received from the cell.

Perform a registration procedure, a UE onboarding procedure, and/or a (remote) provisioning procedure with a CN via the cell where the UE receives the indication(s). For example, the UE may first perform an RRC procedure with the cell (e.g., an RRC Setup procedure) to establish an RRC connection with the cell, and then perform a NAS (-level) procedure (e.g., the registration procedure, the UE onboarding procedure, and/or the (remote) provisioning procedure) with the CN via the cell.

Perform an SNPN selection. For example, the UE may select the SNPN operating the cell that broadcasts the indication(s) (e.g., the indication(s) being associated with the SNPN) as an outcome of the SNPN selection.

Cell (Re)Selection

In some implementations, after determining that one of the above cases (e.g., Case 1, Case 2, Case 4, Case 5, Case 6, Case 7) has occurred, a UE may (continue to) perform a cell (re)selection evaluation process on a cell. The UE may treat the cell as a candidate cell for the cell (re)selection procedure.

In some implementations, during the cell (re)selection procedure, the UE may first perform an S criterion and/or an R criterion on cells around the UE. The details of the S criterion and the R criterion may be found in 3GPP TS 38.304 v16.3.0. Among the cells being evaluated via the S criterion and/or R criterion, the UE may further perform determination (e.g., by reading the SI of the cell) by UE internal cross-layer determination, to check which case is applicable for the cells. It should be noted that the UE may perform the determination on all the cells being evaluated via the S criterion and/or R criterion, on the cells with the highest S value and/or R value, on the cells with a S value above a threshold and/or the highest R value, and/or on the cells with a S value above a threshold and/or the highest-N R value. N may be a predetermined or specified value. After the determination, the cells that satisfy the case(s) Case 1, Case 2, Case 4, Case 5, Case 6, Case 7) may be considered by the UE as candidate cells for cell (re)selection. Among all candidate cells, the UE may first consider the cells that satisfy at least one of the cases among Case 1, Case 2 and Case 4 and satisfy at least one of the cases among Case 5, Case 6 and Case 7, as candidate cells for cell (re)selection. Among such candidate cells, the UE may then camp on a suitable cell that has the highest R value and meets the S criterion as the outcome of the cell (re)selection procedure. In some other implementations, the UE may select a cell among such cells that meet the conditions of a suitable cell or an acceptable cell, as the outcome of the cell (re)selection. However, among all candidate cells, if the UE does not find a cell that satisfies at least one of the cases among Case 1, Case 2 and Case 4 and at least one of the cases among Case 5, Case 6 and Case 7, the UE may consider the cells that satisfy one of the cases among Case 1, Case 2, Case 4, Case 5, Case 6, and Case 7, as candidate cells for cell (re) selection. Among such candidate cells. The UE may then camp on a suitable cell that has the highest R value and meets the S criterion as the outcome of the cell (re)selection procedure. In some other implementations, the UE may select a cell among such cells that meets the conditions of a suitable cell or an acceptable cell, as the outcome of the cell (re)selection.

In some implementations, during the cell (re)selection procedure, the UE may first perform determination on the cells around the UE (e.g., by reading SI of the cell) by the UE internal cross-layer determination, to check which case is applicable for the cells. If the UE finds at least one cell that satisfies at least one of the cases among Case 1, Case 2 and Case 4 and satisfies at least one of the cases among Case 5, Case 6 and Case 7, the UE may then perform an S criterion and/or R criterion on these cells. The UE may select a cell among these cells with the S value above a threshold and the highest R value, as the outcome of the cell (re)selection. In some other implementations, the UE may select a cell that meets the conditions of a suitable cell or an acceptable cell, as the outcome of the cell (re)selection. If the UE does not find at least one cell that satisfies at least one of the cases among Case 1, Case 2 and Case 4 and satisfies at least one of the cases among Case 5, Case 6 and Case 7, the UE may further perform the S criterion and/or R criterion on cells that satisfy one of the cases among Case 1, Case 2, Case 4, Case 5, Case 6 and Case 7. The UE may further perform the S criterion and/or R criterion on these cells. The UE may select a cell among these cells with the S value above a threshold and the highest R value, as the outcome of the cell (re)selection. In some other implementations, the UE may select a cell that meets the conditions of a suitable cell or an acceptable cell, as the outcome of the cell (re)selection.

In some implementations, the UE may select a cell not belonging to the selected network or registered network of the UE as the outcome of the cell (re)selection. The selected cell may satisfy at least one of Case 1, Case 2, Case 4, Case 5, Case 6, and Case 7.

Suitable Cell Definition

In some implementations, when the above cases are considered or when a cell broadcasts at least one of an indication that indicates to the UE whether the cell (or SNPN(s) operating the cell or the SNPN operating the cell and being associated with the indication) supports access using credentials from a separate entity that does not operate the cell and an indication that indicates to the UE whether the network (e.g., an SNPN) allows registration attempts from UEs that are not explicitly configured to select the network (e.g., the SNPN), a UE operating in an SNPN access mode may determine whether the cell can be a suitable cell based on (but not limited to) the following conditions:

- Either the cell is part of the selected SNPN (or the registered SNPN of the UE or an SNPN of the Equivalent SNPN list), or the cell is neither part of the selected SNPN nor the registered SNPN of the UE, but the cell supports access using credentials from a separate entity and/or the cell indicates that the network of (or operating) the cell allows registration attempts from UEs that are not explicitly configured to select the network.
- The cell supports access using credentials from a separate entity, and the UE has a credential from a separate entity, where the separate entity may not operate/own the selected SNPN or the registered SNPN of the UE.
- The network (e.g., an SNPN) allows registration attempts from UEs that are not explicitly configured to select the network (e.g., the SNPN), and the UE is not explicitly configured to select the network, where the network may not be the selected network or the registered network of the UE.
- The cell selection criteria (e.g., an S criterion) are fulfilled.
- According to the latest information provided by a NAS, the cell is not barred.
- According to the latest information provided by a NAS, the cell is part of at least one TA that is not part of the list of "Forbidden Tracking Areas for Roaming" that belongs to either the selected SNPN or the registered SNPN of the UE.

In some implementations, when the above cases are considered or when a cell broadcasts at least one of an indication that indicates to the UE whether the cell (or SNPN(s) operating the cell or the SNPN operating the cell and being associated with the indication) supports access using credentials from a separate entity that does not operate the cell and an indication that indicates to the UE whether the network (e.g., an SNPN or the SNPN operating the cell and being associated with the indicator) allows registration attempts from UEs that are not explicitly configured to select the network (e.g., the SNPN), a UE not operating in an SNPN access mode may determine whether the cell can be a suitable cell based on (but not limited to) the following conditions:

- The cell is part of the selected PLMN (or the registered PLMN of the UE or a PLMN of the Equivalent PLMN list). For that PLMN, either the PLMN ID of that PLMN is broadcast by the cell with no associated CAG IDs and CAG-only indication in the UE for that PLMN is absent or false, or Allowed CAG list in the UE for that PLMN includes a CAG ID broadcast by the cell for that PLMN.
- The cell is neither part of the selected PLMN nor the registered PLMN of the UE nor PLMN of the Equivalent PLMN list, but the cell supports access using credentials from a separate entity and/or the cell indicates that the network of (or operating) the cell allows registration attempts from UEs that are not explicitly configured to select the network.
- The cell supports access using credentials from a separate entity, and the UE has a credential from a separate entity, where the separate entity may not operate/own the selected PLMN or the registered PLMN of the UE.
- The network (e.g., a PLMN) allows registration attempts from Ues that are not explicitly configured to select the network (e.g., the PLMN), and the UE is not explicitly configured to select the network, where the network may not be the selected network or the registered network of the UE.
- The cell selection criteria (e.g., an S criterion) are fulfilled.
- According to the latest information provided by a NAS, the cell is not barred.
- According to the latest information provided by a NAS, the cell is part of at least one TA that is not part of the list of "Forbidden Tracking Areas for Roaming" that belongs to either the selected PLMN or the registered PLMN of the UE.

In some implementations, the UE may select a suitable cell as the outcome of the cell (re)selection procedure. It should be noted that the UE may (temporarily) select or register a network where a cell of the network supports access using credentials from a separate entity. It should be noted that the UE may (temporarily) select or register a network where the network allows registration attempts from Ues that are not explicitly configured to select the network. It should be noted that for a cell indicating that access using credentials from a separate entity is supported and/or a cell indicating registration attempts from Ues that are not explicitly configured to select the network is allowed, the network of (or operating) the cell may be considered as one network in the Equivalent network list. The network may include an SNPN and a PLMN.

Acceptable Cell Definition

In some implementations, when the above cases are considered or when a cell broadcasts at least one of an indication that indicates to the UE whether the cell (or SNPN(s) operating the cell or the SNPN operating the cell and being associated with the indication) supports access using credentials from a separate entity that does not operate the cell and an indication that indicates to the UE whether the network (e.g., an SNPN or the SNPN operating the cell and being associated with the indication) allows registration attempts from UEs that are not explicitly configured to select the network (e.g., the SNPN or the SNPN operating the cell and being associated with the indication), the UE may determine whether the cell can be an acceptable cell based on (but not limited to) the following conditions:

- The cell is not barred.
- The cell selection criteria are fulfilled.
- The cell supports access using credentials from a separate entity.
- The network allows registration attempts from Ues that are not explicitly configured to select the network.

In some implementations, an acceptable cell may be a cell on which the UE may camp to obtain limited service (originate emergency calls and received Earthquake and Tsunami Warning System (ETWS) and Commercial Mobile Alert System (CAMS) notification), to access using credentials from a separate entity, and/or to perform registration attempt even though the UE is not explicitly configured to select the network operating the cell. The UE may select an acceptable cell as the outcome of the cell (re)selection procedure.

In some implementations, based on NAS determination, the UE may determine whether a cell is appropriate. The UE may camp on the cell, reselect another cell, bar the cell, and/or ignore parameters (e.g., related to the cell). The UE may further judge the suitable cell definition (e.g., a cell neither belonging to the selected SNPN nor the registered SNPN).

Cell Barring

In some implementations, if a UE determines that at least one of Case 2, Case 3, Case 4, Case 5, Case 7 and Case 8 has occurred, the UE may bar the cell. The UE may bar the cell for a fixed duration. The duration may be (pre)determined or specified (e.g., 300 s). The UE may bar the cell until a specific condition is met. For example, the UE may bar the cell until an SNPN/PLMN is reselected. The UE may bar the cell until an RAT is reselected. The UE may bar the cell until a de-registration procedure is performed. In some implementations, the UE may bar other cells on the same frequency for the fixed duration. In some other implementations, the UE may not bar other cells on the same frequency for the fixed duration. In some implementations, the UE may lower the priority of the frequency (e.g., for another fixed duration) where the cell operates. The duration may be (pre)determined or specified.

Cells with Cell Reservation, Access Restrictions or Unsuitable for Normal Camping In some implementations, for the highest ranked cell (including serving cell(s)) according to cell reselection criteria and for the best cell according to absolute priority reselection criteria, a UE may further check if access is restricted according to specific rule(s) based on an indication that indicates to the UE whether the cell (or SNPN(s) operating the cell or the SNPN operating the cell and being associated with the indicator) supports access using credentials from a separate entity that does not operate the cell and/or an indication that indicates to the UE whether the network (e.g., an SNPN or the SNPN operating the cell and being associated with the indicator) allows registration attempts from UEs that are not explicitly configured to select the network.

In some implementations, if the highest ranked cell (or the best cell) and other cells (e.g., on the same frequency) have to be excluded from the candidate list, the UE may not consider these cells as candidates for cell reselection. This limitation may be removed when the highest ranked cell changes.

In some implementations, if the highest ranked cell (or the best cell) according to absolute priority reselection rules is an intra-frequency or inter-frequency cell that is not suitable due to (but not limited to) one or more of the following reasons, the UE may not consider this cell and, for operation on a licensed spectrum, other cells (e.g., on the same frequency) as candidates for reselection for a maximum of 300 seconds.

This cell belongs to a PLMN that is not indicated as being equivalent to a registered PLMN.
This cell is a CAG cell that belongs to a PLMN that is equivalent to a registered PLMN but with no CAG ID that is present in the UE's allowed CAG list being broadcast.
This cell is not a CAG cell and a CAG-only indication in the UE is set.
This cell does not belong to an SNPN that is equal to a registered or selected SNPN of the UE in an SNPN access mode.
This cell does not support access using credentials from a separate entity.
The network (e.g., an SNPN) does not allow registration attempts from UEs that are not explicitly configured to select the network (e.g., the SNPN).

In some implementations, for operation with shared spectrum channel access, when the highest ranked cell or the best cell is not a candidate for reselection, the UE may (continue to) consider other cells on the same frequency for cell reselection. However, if the second highest ranked cell on this frequency is also not suitable due to one or more of the above reasons, the UE may consider this frequency to be the lowest priority for a maximum of 300 seconds.

Ignorance

In some implementations, when a UE does not have a credential (or any credential) from a separate entity, the UE may ignore an indication (from the cell) indicating the UE whether the cell (or SNPN(s) operating the cell or the SNPN operating the cell and being associated with the indication) supports access using credentials from a separate entity that does not operate the cell.

In some implementations, when the UE is explicitly configured to select a network, the UE may ignore an indication (from a cell of the network) indicating the UE whether the network (e.g., an SNPN or the SNPN operating the cell and being associated with the indication) allows registration attempts from UEs that are not explicitly configured to select the network (e.g., the SNPN).

In some implementations, if the UE ignores the indication that indicates to the UE whether the cell (or SNPN(s) operating the cell or the SNPN operating the cell and being associated with the indication) supports access using credentials from a separate entity that does not operate the cell and/or the indication that indicates to the UE whether the network (e.g., an SNPN) allows registration attempts from UEs that are not explicitly configured to select the network (e.g., the SNPN or the SNPN operating the cell and being associated with the indication), the UE may perform cell (re)selection based on the legacy rules.

RRC Procedure

In some implementations, if (or once) a UE camps on a cell (e.g., when at least one of Case 1, Case 2, Case 4, Case 5, Case 6, and Case 7 is determined to be occurred), the UE may perform an RRC procedure (e.g., an RRC Setup procedure, an RRC Resume procedure) with the cell. Via the RRC procedure, the UE may exchange (e.g., transmit and/or receive) NAS information with a CN to perform a UE onboarding procedure, a (remote) provisioning procedure and/or a registration procedure (e.g., to get authorized access and connectivity to an NPN, to acquire the UE's NPN credential).

In some implementations, in the RRC procedure, the UE may transmit a first RRC message (e.g., an RRC Setup Request message, RRC Resume Request message, RRC Resume Request 1 message, RRC Reestablishment Request message) to a serving cell via an SRB0 or SRB1. The UE (e.g., an RRC entity of the UE, an RLC entity of the UE with transparent mode) may transmit a CCCH PDU including the first RRC message via the SRB0 or SRB1 to an MAC entity of the UE. The UE may transmit an MAC PDU including the CCCH PDU (e.g., in a message 3 (Msg 3)) to the cell.

In some implementations, the first RRC message may include (but is not limited to) at least one of information indicating whether the UE has a credential from a separate entity, information about the UE credential (e.g., part of the UE credential, common part of the UE credential), information about the separate entity, information indicating whether the UE is explicitly configured to select a network, NAS information and/or AS information acquired during the UE determination procedure, an establishment/resume cause value, and information indicating that an RRC connection is setup/resumed/reestablished for the registration procedure (e.g., especially for UE onboarding with default UE credentials). The establishment/resume cause value may be an existing value (e.g., mo-Signaling) and further be associated with UE onboarding (e.g., especially with default UE credentials), (remote) provisioning, access using credentials from a separate entity, and/or registration attempts from UEs that are not explicitly configured to select the network. The establishment/resume cause value may be a new value that is associated with UE onboarding, (remote) provisioning, access using credentials from a separate entity, and/or registration attempts from UEs that are not explicitly configured to select the network. A new access category may be applicable for access attempt(s) due to UE onboarding, (remote) provisioning, access using credentials from a separate entity, and/or registration attempts from UEs that are not explicitly configured to select the network. A new access ID may be applicable for whether the UE is explicitly configured to select the network and/or whether the UE has a credential from a separate entity. After receiving the access category and/or access ID from the NAS layer of the UE, the AS layer of the UE (e.g., an RRC layer of the UE) may set the establishment cause value associated with the received access category and/or an access ID in the first RRC message. It should be noted that the information indicating that the RRC connection is setup/resumed/reestablished for the registration procedure (e.g., especially for UE onboarding, with default UE credentials) and/or the establishment/resume cause value may be applied by the cell (or a network (e.g., a RAN) operating the cell) to select an appropriate AMF that supports UE onboarding procedures.

In some implementations, after transmitting the first RRC message, the UE may receive a second RRC message (e.g., an RRC Setup message, RRC Resume message, RRC Reestablishment message, RRC Reject message) (in response to the first message) from the cell. After receiving the second RRC message, the UE may further set (or determine) content of a third RRC message (e.g., an RRC Setup Complete message, RRC Resume Complete message, RRC Reestablishment complete message). For example, the third RRC message may include (but is not limited to) at least one of information indicating whether the UE has a credential from a separate entity, information about the UE credential (e.g., part of the UE credential, common part of the UE credential), information about the separate entity, information indicating whether the UE is explicitly configured to select the network, information about the CN and/or entity that provides the UE's credentials, NAS information and/or AS information acquired during the UE determination procedure, information indicating that an RRC connection is setup for the registration procedure (e.g., especially for UE onboarding with default UE credentials) and/or establishment cause value. The UE may transmit the third RRC message to the cell via SRB0 or SRB1. The UE (e.g., the RRC entity of the UE, the RLC entity of the UE with acknowledgement mode) may transmit a DCCH PDU including the third RRC message via an SRB0 or SRB1 to the MAC entity of the UE. The UE may transmit an MAC PDU including the DCCH PDU (e.g., in a message 5 (Msg 5)), to the cell. It should be noted that the information indicating that the RRC connection is setup/resumed/reestablished for the registration procedure (e.g., especially for UE onboarding with default UE credentials) and/or the establishment/resume cause value may be applied by the cell (or a network (e.g., a RAN) operating the cell) to select an appropriate AMF that supports UE onboarding procedures.

NAS Procedure

In some implementations, a UE may transmit a first NAS message to a CN via a cell (or a network (e.g., a RAN) operating the cell) for a UE onboarding procedure, for a registration procedure (for onboarding), and/or for a (remote) provisioning procedure. The UE may encapsulate the first NAS message into an RRC message (e.g., the third RRC message as described above) and transmit the RRC message including the first NAS message to the cell. The cell (or the network operating the cell) may perform AMF selection (e.g., to select an AMF in the CN (entity)) based on the RRC message including the first NAS message. The cell (or the network operating the cell) may further transmit (or forward) the first NAS message to the CN. The first NAS message may be (but not limited to) an (NAS) registration request message, PDU session establishment request message, PDU session authentication request message, or PDU session modification request message. The first NAS message may include (but is not limited to) at least one of information indicating whether the UE has a credential from a separate entity, information about the UE credential (e.g., part of the UE credential, common part of the UE credential), information about the separate entity, information indicating whether the UE is explicitly configured to select a network, NAS information and/or AS information acquired during the UE determination procedure, information indicating a UE onboarding procedure (e.g., especially with default UE credentials) request, and information indicating (remote) provisioning request. The CN may determine whether the UE is allowed to perform the registration procedure (for onboarding), the UE onboarding procedure, or the (remote) provisioning procedure (e.g., based on the first NAS message).

In some implementations, the CN may transmit a second NAS message (e.g., a registration accept message, PDU session establishment accept message, PDU session authentication accept message, PDU session modification accept message) (in response to the first NAS message) to the UE via the cell (or the network operating the cell) when the CN determines that the UE is allowed to perform the registration procedure (for onboarding), the UE onboarding procedure, or the (remote) provisioning procedure (e.g., the UE is accepted to perform the registration procedure (for onboarding)). The second NAS message may include information indicating that the UE is accepted to perform the registration procedure (for onboarding), the UE credential for NPN and/or the UE credential for the network operating the cell.

In some implementations, after receiving the second NAS message, the UE may apply the information included in the second NAS message and transmit a third NAS message (e.g., a registration complete message, PDU session establishment complete message, PDU session authentication complete message, PDU session modification complete message) (in response to the third NAS message) to the CN via the cell (or the network operating the cell).

FIG. 1 is a signaling flow diagram 100 illustrating a registration procedure between a UE 102, a network (e.g., a RAN) 104, and a CN (entity) 106 according to an example implementation of the present disclosure. In action 110, the UE 102 may transmit a Registration Request message (via an RRC setup complete message) to the network 104. In action 112, the network 104 may perform AMF selection (e.g., to select CN 106). In action 114, the network 104 may transmit (or forward) the Registration Request message (or another message that indicates a network registration request) to the CN 106. In action 116, the CN 106 may perform a determination of whether the registration is accepted (e.g., according to an authentication procedure). In action 118, the CN 106 may transmit a Registration Accept message (e.g., forwarded through the network 104) to the UE 102 (in response to the Registration Request message), if the determination of the registration is accepted. In action 120, the UE 102 may transmit a Registration Complete message to the CN 106 (in response to the Registration Accept message).

In some implementations, the CN may transmit a fourth NAS message (e.g., a registration reject message, PDU session establishment reject message, PDU session authentication reject message, PDU session modification reject message) (in response to the first NAS message) to the UE via the cell when the CN determines that the UE is not allowed to perform the registration procedure (for onboarding), the UE onboarding procedure, or the (remote) provisioning procedure, (e.g., the UE is rejected to perform the registration procedure (for onboarding)). The fourth NAS message may include information indicating that the UE is rejected to perform the registration procedure (for onboarding) and/or a cause value indicating the reason that the UE is rejected to perform the registration procedure (for onboarding).

Figure 2:
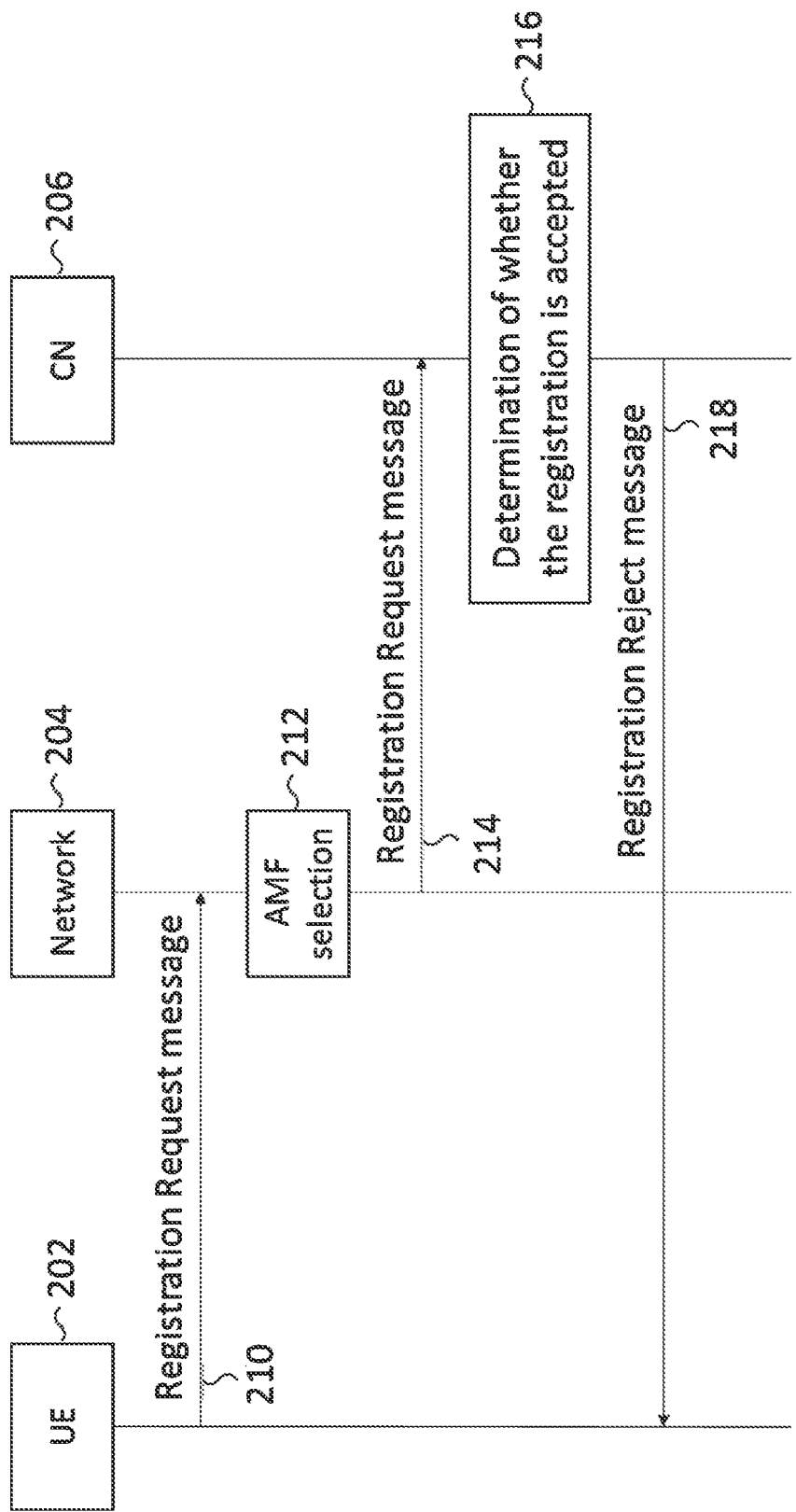
FIG. 2 is a signaling flow diagram illustrating a registration procedure between a UE, a network, and a CN according to an example implementation of the present disclosure.

FIG. 2 is a signaling flow diagram 200 illustrating a registration procedure between a UE 202, a network (e.g., a RAN) 204, and a CN 206 according to an example implementation of the present disclosure. In action 210, the UE 202 may transmit a Registration Request message (via an RRC complete message) to the network 204. In action 212, the network 204 may perform AMF selection (e.g., to select CN 206). In action 214, the network 204 may transmit (or forward) the Registration Request message (or a similar message) to the CN 206. In action 216, the CN 206 may perform a determination of whether the registration is accepted (e.g., according to an authentication procedure). In action 218, the CN 206 may transmit a Registration Reject message (e.g., forwarded through the network 204) to the UE 202 (in response to the Registration Request message), if the determination of the registration is rejected.

Cell Barring Information

In some implementations, a UE may determine whether to select a cell based on (but not limited to) at least one of a UE NAS determination, a UE AS determination, indication(s) between an AS layer of the UE and a NAS layer of the UE, an indication indicating to a UE whether a cell (or SNPN(s) operating the cell or the SNPN operating the cell and being associated with the indication) supports access using credentials from a separate entity that does not operate the cell, an indication that indicates to the UE whether a network (e.g., an SNPN or the SNPN operating the cell and being associated with the indication) allows registration attempts from UEs that are not explicitly configured to select the network (e.g., the SNPN or the SNPN operating the cell and being associated with the indication), and an indication that indicates to the UE whether a network (e.g., an SNPN or the SNPN operating the cell and being associated with the indication) supports onboarding (e.g., support for UE onboarding indication), and cell barring information.

In some implementations, the UE may ignore the cell barring information (e.g., an intra-frequency cell reselection indicator) received from an MIB or a SIB1 of the cells if the UE determines that the cells on the intra-frequency support UE onboarding, the cells on the intra-frequency support access using credentials from a separate entity, network(s) of the cells on the intra-frequency allows registration attempts from UEs that are not explicitly configured to select the network(s).

Figure 3:
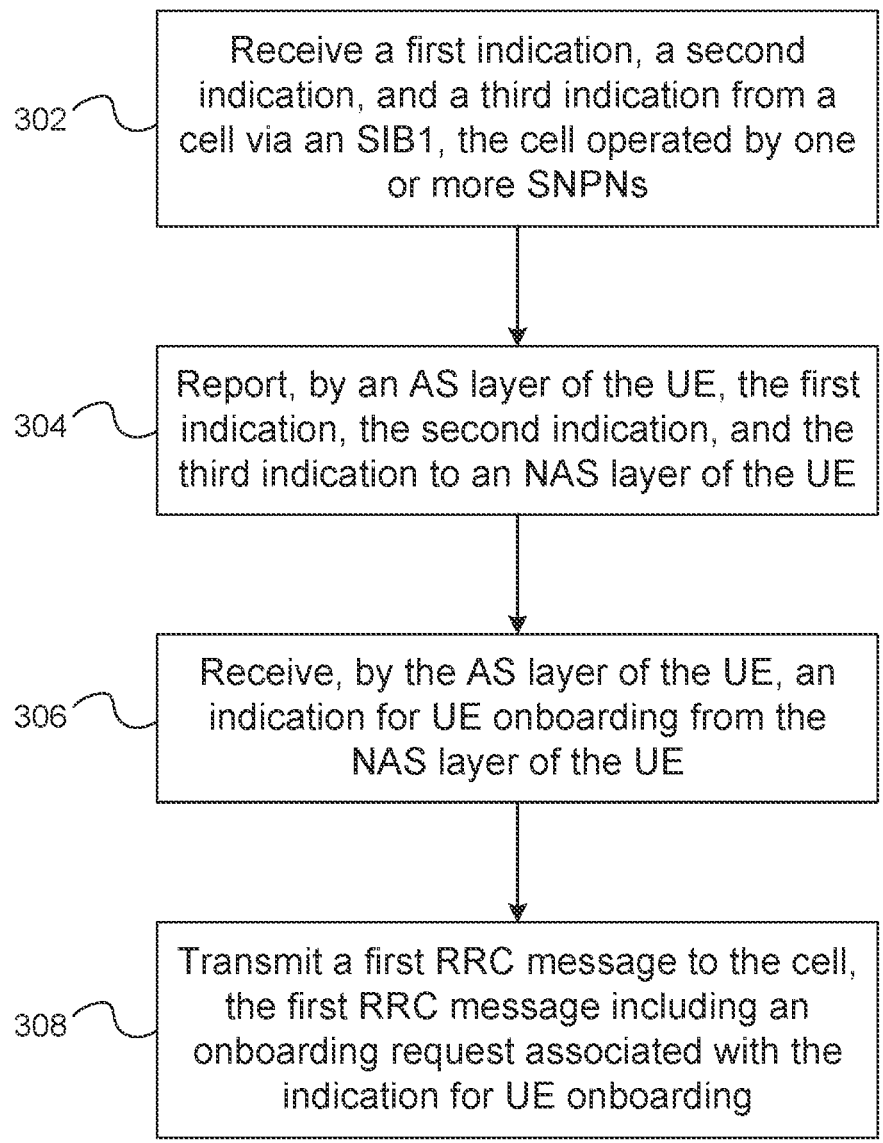
FIG. 3 is a flowchart illustrating a method for handling UE onboarding performed by a UE according to an example implementation of the present disclosure.

FIG. 3 is a flowchart illustrating a method 300 for handling the UE onboarding performed by a UE according to an example implementation of the present disclosure. In action 302, the UE may receive a first indication, a second indication, and a third indication from a cell via a SIB1. The cell may be operated by one or more SNPNs. In action 304, an AS layer of the UE may report (or forward) the first indication, the second indication, and the third indication to a NAS layer of the UE. In action 306, the AS layer of the UE may receive an indication for UE onboarding from the NAS layer of the UE. In action 308, the UE may transmit a first RRC message to the cell. The first RRC message may include an onboarding request associated with the indication for the UE onboarding. The first indication may indicate whether each particular SNPN of the one or more SNPNs operating the cell supports access using the credentials provided by (or from) a separate entity (e.g., a credential holder) that does not operate the cell. The second indication may indicate whether each particular SNPN of the one or more SNPNs operating the cell allows registrations from UEs that are not explicitly configured to select the particular SNPN. The third indication may indicate whether each particular SNPN of the one or more SNPNs operating the cell supports the UE onboarding.

It should be noted that the first indication may be equivalent to indicating, for each of the one or more SNPNs operating the cell, whether the cell supports access using credentials provided by a separate entity that does not operate the cell. The second indication may be equivalent to indicating, for each of the one or more SNPNs operating the cell, whether an SNPN allows registrations from UEs that are not explicitly configured to select the SNPN. The third indication may be equivalent to indicating, for each of the one or more SNPNs operating the cell, whether the cell supports UE onboarding. It should be noted that each of the first indication, the second indication, and the third indication may be (transmitted/configured) per each particular SNPN of the one or more SNPNs in the SIB1. For example, a cell may be operated by a first SNPN and a second SNPN. The first indication may indicate whether the first SNPN supports access using credentials provided by a separate entity that does not operate the cell and whether the second SNPN supports access using credentials provided by a separate entity that does not operate the cell. The second indication may indicate whether the first SNPN allows registrations from UEs that are not explicitly configured to select the first SNPN and whether the second SNPN allows registrations from UEs that are not explicitly configured to select the second SNPN. The third indication may indicate whether the first SNPN supports the UE onboarding and whether the second SNPN supports the UE onboarding.

In some implementations, the UE may receive one or more group IDs from the cell via a SIB (e.g., a new SIB) different from the SIB1. Each of the one or more group IDs may be associated with at least one of the one or more SNPNs operating the cell.

In some implementations, each of the first indication, the second indication, and the third indication for an SNPN of the one or more SNPNs operating the cell may be in an ENUMERATED {true} format. In some implementations, each of the first indication, the second indication, and the third indication for the SNPN of the one or more SNPNs operating the cell may be a field (e.g., included in an SNPN-AccessInfo field) in the SIB1. For example, Table 1 illustrates formats of the first indication, the second indication, and the third indication. The first indication, the second indication, and the third indication may correspond to an access-Supported field, a regWithoutConfig-Allowed field, an onboarding-Supported field, respectively.

TABLE 1

```
SNPN-AccessInfo ::=          SEQUENCE {
    access-supported             ENUMERATED {true}   OPTIONAL
    regWithoutConfig-Allowed     ENUMERATED {true}   OPTIONAL
    onboarding-Supported         ENUMERATED {true}   OPTIONAL
}
```

In some implementations, the UE may perform an SNPN selection procedure based on the first indication, the second indication, and the third indication. In some implementations, the indication for UE onboarding may be received after the SNPN selection procedure is completed.

Figure 4:
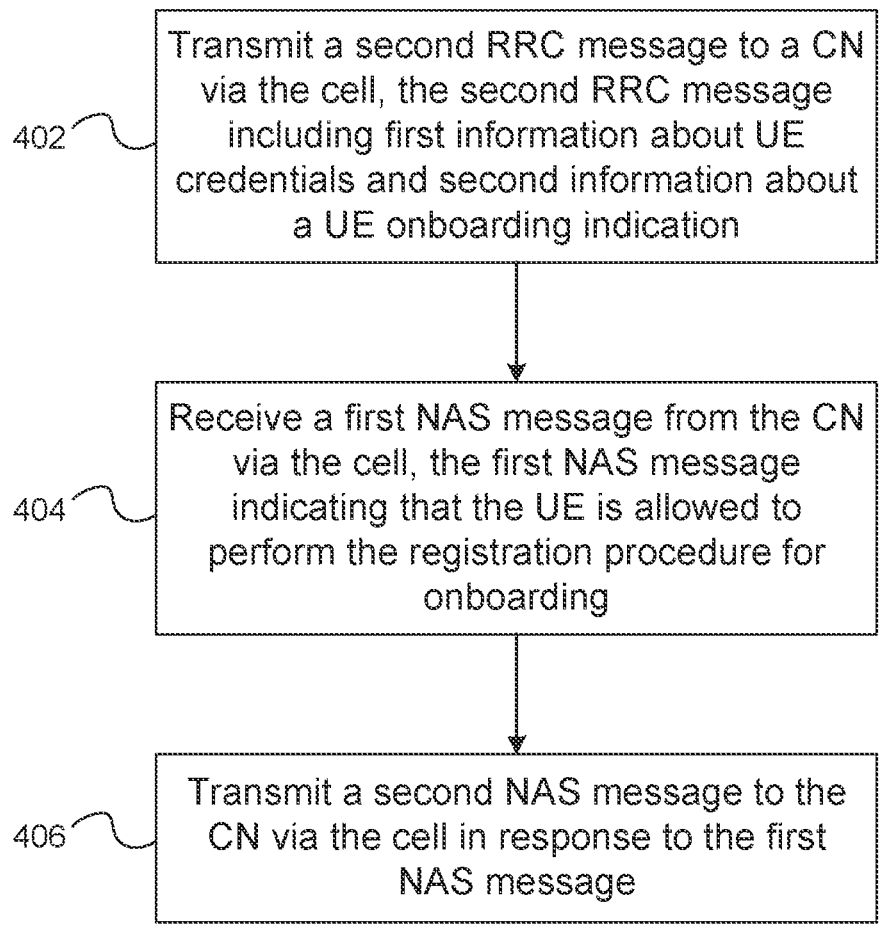
FIG. 4 is a flowchart illustrating a method for handling a registration procedure performed by a UE according to an example implementation of the present disclosure.

FIG. 4 is a flowchart illustrating a method 400 for handling a registration procedure performed by a UE (e.g., the UE performing the method 300) according to an example implementation of the present disclosure. In action 402, the UE may transmit a second RRC message to a CN via the cell. The second RRC message may include first information about UE credentials and second information about a UE onboarding indication. The first information and the second information may be from the NAS layer of the UE. The first information and the second information may enable the CN to determine whether the UE is allowed to perform a registration procedure for the onboarding. In action 404, the UE may receive a first NAS message (e.g., in response to a NAS message in the second RRC message) from the CN via the cell. The first NAS message may indicate that the UE is allowed to perform the registration procedure for onboarding. In action 406, the UE may transmit a second NAS message to the CN via the cell in response to receiving the first NAS message.

Figure 5:
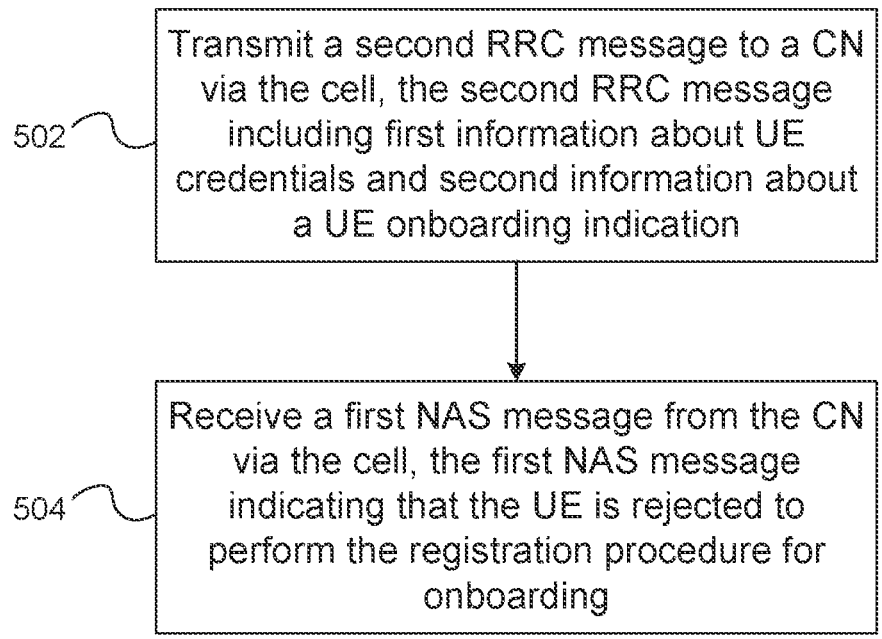
FIG. 5 is a flowchart illustrating a method for handling a registration procedure performed by a UE according to an example implementation of the present disclosure.

FIG. 5 is a flowchart illustrating a method 500 for handling a registration procedure performed by a UE (e.g., the UE performing the method 300) according to an example implementation of the present disclosure. In action 502, the UE may transmit a second RRC message to a CN via the cell. The second RRC message may include first information about UE credentials and second information about a UE onboarding indication. The first information and the second information may be from the NAS layer of the UE. The first information and the second information may enable the CN to determine whether the UE is allowed to perform a registration procedure for onboarding. In action 504, the UE may receive a first NAS message (e.g., in response to a NAS message in the second RRC message) from the CN via the cell. The first NAS message may indicate that the UE is rejected to perform the registration procedure for onboarding.

In some implementations, the second information may enable an AMF and an SMF in the CN to determine whether the UE is allowed to perform a UE onboarding procedure. In some implementations, the second information may enable the cell to select an AMF in the CN. In some implementations, the first RRC message and the second RRC message may be the same. In some other implementations, the first RRC message and the second RRC message may be different. In some implementations, the UE onboarding indication (included in the second RRC message) and the onboarding request (included in the first RRC message) may be the same. In some implementations, the UE onboarding indication (included in the second RRC message) and an UE onboarding indication (e.g., included in a NAS message encapsulated in the second RRC message) may be the same, and the UE onboarding indication may be of a registration type. In some implementations, the UE onboarding indication (included in the second RRC message) and the indication for UE onboarding (from the NAS layer of the UE) may be different.

It should be noted that the order in which the process is described is not intended to be construed as a limitation, and any number of the described actions may be combined in any order to implement the method or an alternate method. Moreover, one or more of the actions illustrated in FIGS. 3 through 5 may be omitted in some implementations.

Figure 6:
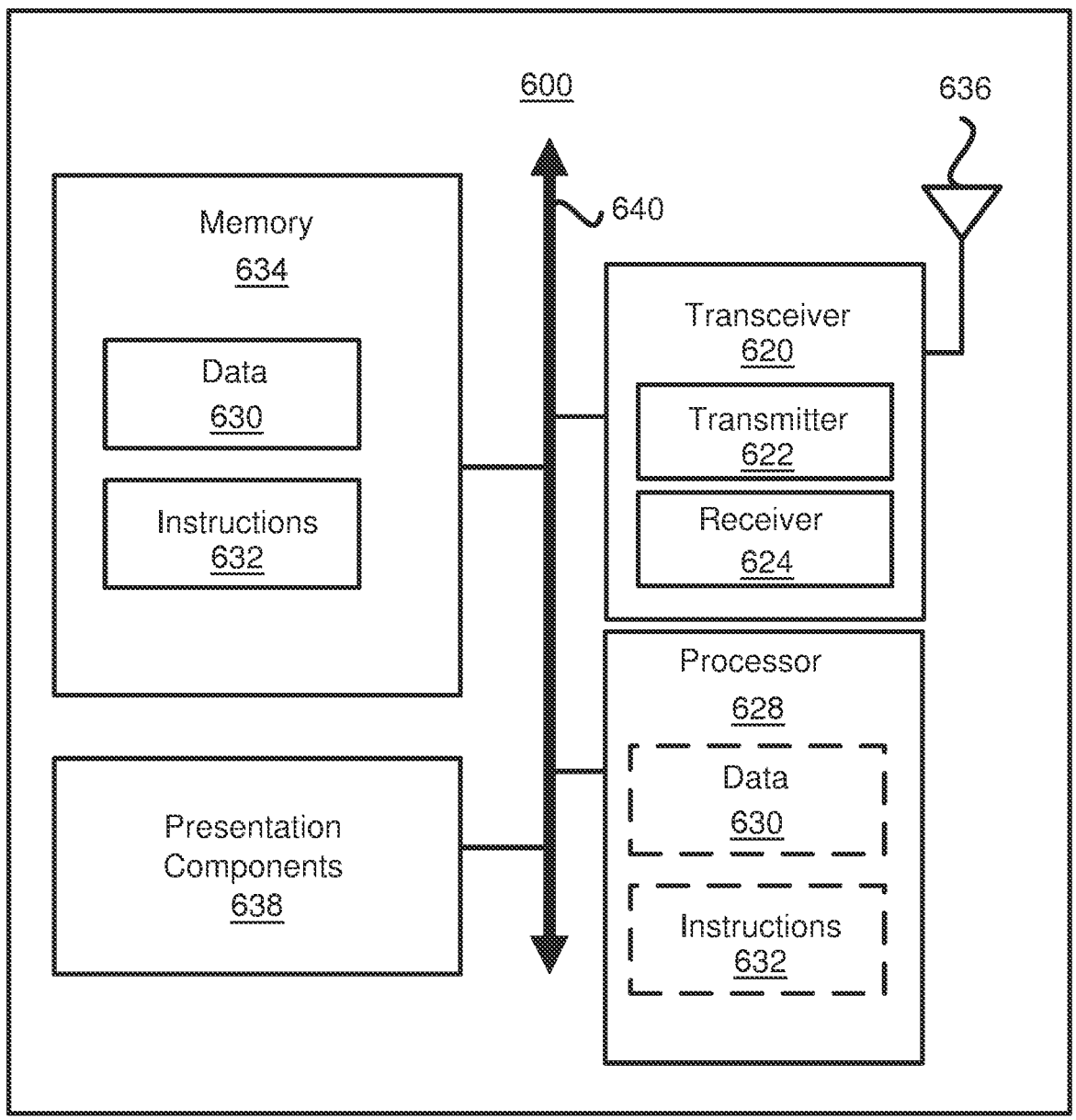
FIG. 6 is a block diagram illustrating a node for wireless communication according to an example implementation of the present disclosure.

FIG. 6 is a block diagram illustrating a node 600 for wireless communication according to an example implementation of the present disclosure. As illustrated in FIG. 6, a node 600 may include a transceiver 620, a processor 628, a memory 634, one or more presentation components 638, and at least one antenna 636. The node 600 may also include a RF spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 1 through 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory includes solid-state memory, hard drives, optical-disc drives, etc. As illustrated in FIG. 6, the memory 634 may store computer-readable, computer-executable instructions 632 (e.g., software codes) that are configured to cause the processor 628 to perform various disclosed functions, for example, with reference to FIGS. 1 through 5. Alternatively, the instructions 632 may not be directly executable by the processor 628 but be configured to cause the node 600 (e.g., when compiled and executed) to perform various disclosed functions.

The processor 628 (e.g., having processing circuitry) may include an intelligent hardware device, e.g., a Central Processing Unit (CPU), a microcontroller, an ASIC, etc. The processor 628 may include memory. The processor 628 may process data 630 and the instructions 632 received from the memory 634, and information transmitted and received via the transceiver 620, the base band communications module, and/or the network communications module. The processor 628 may also process information to be sent to the transceiver 620 for transmission via the antenna 636 to the network communications module for transmission to a CN.

One or more presentation components 638 present data indications to a person or another device. Examples of presentation components 638 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art will recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for handling user equipment (UE) onboarding performed by a UE, the method comprising:
   receiving a first indication, a second indication, and a third indication from a cell via a system information block type 1 (SIB1), the cell operated by one or more stand-alone non-public networks (SNPNs);
   reporting, by an access stratum (AS) layer of the UE, the first indication, the second indication, and the third indication to a non-access stratum (NAS) layer of the UE;
   receiving, by the AS layer of the UE, an indication for UE onboarding from the NAS layer of the UE; and
   transmitting a first radio resource control (RRC) message to the cell, the first RRC message including an onboarding request associated with the indication for UE onboarding, wherein:
   the first indication indicates whether each particular SNPN of the one or more SNPNs operating the cell supports access using credentials provided by a separate entity that does not operate the cell;
   the second indication indicates whether each particular SNPN of the one or more SNPNs operating the cell allows registrations from UEs that are not explicitly configured to select the particular SNPN; and
   the third indication indicates whether each particular SNPN of the one or more SNPNs operating the cell supports the UE onboarding.

2. The method of claim 1, further comprising:
   receiving one or more group identifiers (IDs) from the cell via a system information block (SIB) different from the SIB1, wherein each of the one or more group IDs is associated with at least one of the one or more SNPNs operating the cell.

3. The method of claim 1, wherein each of the first indication, the second indication, and the third indication for an SNPN of the one or more SNPNs operating the cell is in an ENUMERATED {true} format.

4. The method of claim 1, further comprising:
   performing an SNPN selection procedure based on the first indication, the second indication, and the third indication.

5. The method of claim 4, wherein the indication for UE onboarding is received after the SNPN selection procedure is completed.

6. The method of claim 1, further comprising:
   transmitting a second RRC message to a core network (CN) via the cell, the second RRC message including first information about UE credentials and second information about a UE onboarding indication, wherein:
   the first information and the second information are from the NAS layer of the UE; and
   the first information and the second information enable the CN to determine whether the UE is allowed to perform a registration procedure for onboarding.

7. The method of claim 6, further comprising:
   receiving a first NAS message from the CN via the cell, the first NAS message indicating that the UE is allowed to perform the registration procedure for onboarding; and
   transmitting a second NAS message to the CN via the cell in response to receiving the first NAS message.

8. The method of claim 6, further comprising:
   receiving a first NAS message from the CN via the cell, the first NAS message indicating that the UE is rejected to perform the registration procedure for onboarding.

9. The method of claim 6, wherein the second information enables an access and mobility function (AMF) and a session management function (SMF) in the CN to determine whether the UE is allowed to perform a UE onboarding procedure.

10. The method of claim 6, wherein the second information enables the cell to select an access and mobility function (AMF) in the CN.

11. A user equipment (UE) for handling onboarding, comprising:
    one or more non-transitory computer-readable media having computer-executable instructions embodied therein; and
    at least one processor coupled to the one or more non-transitory computer-readable media, the at least one processor configured to execute the computer-executable instructions to cause the UE to:
    receive a first indication, a second indication, and a third indication from a cell via a system information block type 1 (SIB1), the cell operated by one or more stand-alone non-public networks (SNPNs);
report, by an access stratum (AS) layer of the UE, the first indication, the second indication, and the third indication to a non-access stratum (NAS) layer of the UE;
receive, by the AS layer of the UE, an indication for UE onboarding from the NAS layer of the UE; and
transmit a first radio resource control (RRC) message to the cell, the first RRC message including an onboarding request associated with the indication for UE onboarding, wherein:
the first indication indicates whether each particular SNPN of the one or more SNPNs operating the cell supports access using credentials provided by a separate entity that does not operate the cell;
the second indication indicates whether each particular SNPN of the one or more SNPNs operating the cell allows registrations from UEs that are not explicitly configured to select the particular SNPN; and
the third indication indicates whether each particular SNPN of the one or more SNPNs operating the cell supports the UE onboarding.

12. The UE of claim 11, wherein the at least one processor is further configured to execute the computer-executable instructions to cause the UE to:
receive one or more group identifiers (IDs) from the cell via a system information block (SIB) different from the SIB1, wherein each of the one or more group IDs is associated with at least one of the one or more SNPNs operating the cell.

13. The UE of claim 11, wherein each of the first indication, the second indication, and the third indication for an SNPN of the one or more SNPNs operating the cell is in an ENUMERATED {true} format.

14. The UE of claim 11, wherein the at least one processor is further configured to execute the computer-executable instructions to cause the UE to:
perform an SNPN selection procedure based on the first indication, the second indication, and the third indication.

15. The UE of claim 14, wherein the indication for UE onboarding is received after the SNPN selection procedure is completed.

16. The UE of claim 11, wherein the at least one processor is further configured to execute the computer-executable instructions to cause the UE to:
transmit a second RRC message to a core network (CN) via the cell, the second RRC message including first information about UE credentials and second information about a UE onboarding indication, wherein:
the first information and the second information are from the NAS layer of the UE; and
the first information and the second information enable the CN to determine whether the UE is allowed to perform a registration procedure for onboarding.

17. The UE of claim 16, wherein the at least one processor is further configured to execute the computer-executable instructions to cause the UE to:
receive a first NAS message from the CN via the cell, the first NAS message indicating that the UE is allowed to perform the registration procedure for onboarding; and
transmit a second NAS message to the CN via the cell in response to receiving the first NAS message.

18. The UE of claim 16, wherein the at least one processor is further configured to execute the computer-executable instructions to cause the UE to:
receive a first NAS message from the CN via the cell, the first NAS message indicating that the UE is rejected to perform the registration procedure for onboarding.

19. The UE of claim 16, wherein the second information enables an access and mobility function (AMF) and a session management function (SMF) in the CN to determine whether the UE is allowed to perform a UE onboarding procedure.

20. The UE of claim 16, wherein the second information enables the cell to select an access and mobility function (AMF) in the CN.

* * * * *